(12) United States Patent
Gilroy et al.

(10) Patent No.: US 9,111,104 B2
(45) Date of Patent: Aug. 18, 2015

(54) ENTITLEMENTS DETERMINATION VIA ACCESS CONTROL LISTS

(71) Applicant: Jive Software, Inc., Portland, OR (US)

(72) Inventors: Darren Gilroy, Portland, OR (US); Seth Pellegrino, Portland, OR (US)

(73) Assignee: Jive Software, Inc., Palo Alto, CA (US)

( * ) Notice: Subject to any disclaimer, the term of this patent is extended or adjusted under 35 U.S.C. 154(b) by 0 days.

(21) Appl. No.: 13/853,940

(22) Filed: Mar. 29, 2013

(65) Prior Publication Data

US 2014/0298481 A1 Oct. 2, 2014

(51) Int. Cl.
*G06F 12/00* (2006.01)
*G06F 21/60* (2013.01)
*G06F 21/62* (2013.01)

(52) U.S. Cl.
CPC .......... *G06F 21/604* (2013.01); *G06F 21/6218* (2013.01); *G06F 2221/2141* (2013.01); *G06F 2221/2145* (2013.01)

(58) Field of Classification Search
USPC ......................................... 726/7, 27; 707/694
See application file for complete search history.

(56) References Cited

U.S. PATENT DOCUMENTS

| | | | |
|---|---|---|---|
| 7,191,185 B2* | 3/2007 | Dweck et al. | 707/694 |
| 7,478,120 B1* | 1/2009 | Zhang | 709/201 |
| 7,508,935 B2* | 3/2009 | Oommen et al. | 380/28 |
| 2003/0084021 A1* | 5/2003 | Dweck et al. | 707/1 |
| 2008/0010448 A1* | 1/2008 | Sabnis et al. | 713/156 |
| 2010/0145655 A1* | 6/2010 | Chu | 702/182 |
| 2012/0290725 A1* | 11/2012 | Podila | 709/226 |

OTHER PUBLICATIONS

Counting spanning trees in a small-world Farey Graph, Zhingzhi Zhang, 2012.*
"Access Control List," *Wikipedia*, visited Feb. 21, 2013, 3 pages.
"ACLs," *Wikipedia*, visited Feb. 21, 2013, 5 pages.
"Class TreeRangeSet," googlecode.com Java documentation (Guava), visited Mar. 5, 2013, 6 pages.
"Domain Object Security (ACLs)," Spring Security Reference Documentation 3.0.8 Release, Section 16, SpringSource Community, visited Feb. 21, 2013, 6 pages.
Hazel, "Using rational numbers to key nested sets," Technology One, Jun. 19, 2008, 18 pages.
Sandhu et al. (Tucker, ed.), "Authentication Access Control and Intrusion Detection," in *The Computer Science and Engineering Handbook*, CRC Press, (1997), Chapter 91, pp. 1929-1948.
"Set (mathematics)," *Wikipedia*, Mar. 28, 2013, 6 pages.

(Continued)

*Primary Examiner* — Joseph P Hirl
*Assistant Examiner* — Sayed Beheshti Shirazi
(74) *Attorney, Agent, or Firm* — Klarquist Sparkman, LLP

(57) ABSTRACT

Entitlements to resources can be determined by using access rules that are organized as respective ranges in an entitlement space. An access rule can represent a range between two rational numbers in the entitlement space; the range can be represented by a single rational number. Due to the way the rational numbers are chosen, a child rule is completely covered by its parent, and a parent has remaining room in the entitlement space for unlimited additional children. Entitlement checking for a large batch of resources can be performed quickly based on reusing calculated permitted ranges in the entitlement space. Implied permissions can be supported. Content can easily be added, and the access rules can be modified without unduly impacting the underlying tree structure, if at all.

20 Claims, 23 Drawing Sheets

(56) References Cited

OTHER PUBLICATIONS

"Interval (mathematics)," *Wikipedia*, Mar. 28, 2013, 7 pages.
"Complement (set theory)," *Wikipedia*, Mar. 28, 2013, 5 pages.
"Continued fraction," *Wikipedia*, Mar. 28, 2013, 15 pages.
"Extended Euclidean algorithm," *Wikipedia*, Mar. 28, 2013, 10 pages.
"Mediant (mathematics)," *Wikipedia*, Mar. 28, 2013, 4 pages.
"Nested set model," *Wikipedia*, Mar. 28, 2013, 5 pages.
Celko, *Joe Celko's SQL for Smarties: Trees and Hierarchies*. Morgan Kaufmann Publishers Inc., San Francisco, CA, USA, 2004, 248 pages.
Tropashko, "Nested intervals tree encoding in SQL," *SIGMOD Record*, 34(2):47-52, 2005.
Tropashko, "Nested Intervals Tree Encoding with Continued Fractions," *CoRR*, cs.DB/0402051, 2004, 6 pages.
Tropashko, "Trees in SQL: Nested Sets and Materialized Path," Version 2, Mar. 18, 2010, 10 pages.
Tropashko, "Trees," Chapter 5 in *SQL Design Patterns: Expert Guide to SQL Programming* (*IT in-Focus series*), Jul. 2011, 39 pages.
Tropashko, "One more Nested Intervals encoding," Jun. 20, 2008, downloaded from http://vadimtropashko.wordpress.com/2008/06/20/one-more-nested-intervals-encoding/, 2 pages.

* cited by examiner

ENTITLEMENTS DETERMINATION VIA ACCESS CONTROL LISTS

BACKGROUND

Information technology thrives on providing content to users. However, any practical implementation involving content for the enterprise requires that access be limited to authorized users only.

Access control lists can be implemented to specify those users who are authorized to access content. When content is requested, the access control list can be checked. However, as the amount of content grows and the number of users increases, it can become burdensome to perform such authorization checks.

If a very large number of content pieces are involved, the process of determining whether a user is authorized for the content can consume considerable resources, leading to performance degradation. There is therefore room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Entitlements to resources can be determined by using access rules that are organized as respective ranges in an entitlement space. An access rule can represent a range between two rational numbers in the entitlement space; the range can be represented by a single rational number. Due to the way the rational numbers are chosen, a child rule is completely covered by its parent, and a parent has remaining room in the entitlement space for unlimited additional children. Entitlement checking for a large batch of resources can be performed quickly based on reusing calculated permitted ranges in the entitlement space. Implied permissions can be supported.

As described herein, a variety of other features and advantages can be incorporated into the technologies as desired.

DETAILED DESCRIPTION

Example 1

Exemplary Overview

The technologies described herein can be used for determining whether a user has permission to access a resource. Adoption of the technologies can provide efficient techniques for enforcing permissions for large collections of resources.

The technologies can be helpful for those wishing control access to resources while maintaining acceptable performance. Beneficiaries include applications or systems that wish to effectively control access to resources in an enterprise environment. Administrators can easily manage large resource collections. Users can also indirectly benefit from the technologies because they can access resources for which they are authorized.

Example 2

Figure 1:
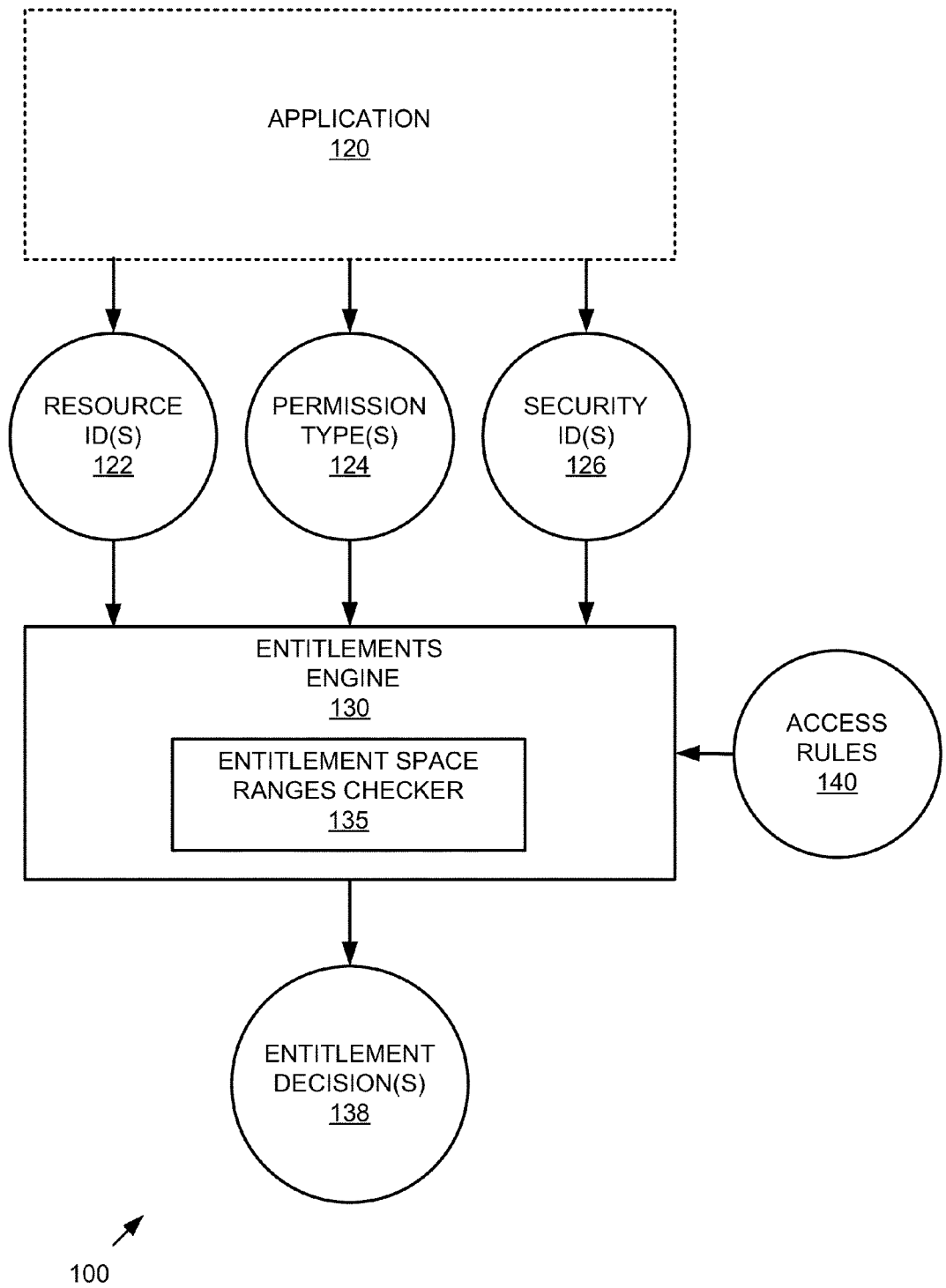
FIG. 1 is a block diagram of an exemplary system implementing entitlements determination via access control lists.

Exemplary System Implementing Entitlements Determination via Access Control Lists FIG. 1 is a block diagram of an exemplary system 100 implementing entitlements determination via access control lists as described herein.

For purposes of context, an application 120 is shown as availing itself of the services of an entitlements engine 130. In practice, the entitlements engine 130 can be incorporated into a broader resource management system or the like.

In the example, the entitlements engine 130 is configured to receive inputs in the form of one or more resource identifiers 122, one or more permission types 124, and one or more security identifiers 126. The entitlements engine 130 also has access to access rules 140 that specify which security identifiers 126 have access to which resources.

In some cases, the permission types 124 or security identifiers 126 can be assumed, so it is not necessary to receive them explicitly. For example, requests for resources indicated by the identifiers 122 may be limited to a particular permission type, or they may come from a particular user whose identity can be determined without receiving information from the application 120.

As described herein, the entitlements engine 130 can be further configured to generate one or more entitlement decisions 138 (e.g., that indicate whether the user represented by the security identifiers 126 is authorized to access the resource identifiers 122 with the permission types 124) based on the access rules 140. The engine 130 can comprise an entitlement space ranges checker 135 to aid in generating the one or more entitlement decisions 138.

As described herein, the entitlement space ranges checker 135 can check a range in an entitlement space associated with a resource identifier against permitted ranges in the entitlement space.

The access rules 140 can be organized according to an underlying hierarchical tree defining an entitlement space. Resource identifiers can be associated with respective nodes in the tree that correspond to ranges in the entitlement space as described herein. Nodes in the tree can represent a resource without an accompanying rule (e.g., the node is governed by parent nodes in the tree representing rules).

As described herein, an early or late binding scenario can be supported.

The entitlement decisions 138 can be sent back to the application 120 or, access to the resources indicated by the resource identifiers 122 can be permitted or blocked according to the decisions 138. For example resource requests can result in grant or denial based on the entitlement decisions 138.

The system 100 can be described as a single, unified system, or one or more client systems and one or more server systems. For example, the application 120 can be considered a separate system, as can the entitlements engine 130. The entitlements engine 130 can interact with additional systems, such as other applications, an operating system, or the like.

In practice, the systems shown herein, such as system 100 can vary in complexity, with different functionality, components of differing complexity, and the like. For example, a large number of resource requests for a single user can be batched. Additional features relating to security and redundancy can also be included.

The system 100 and any of the other systems described herein can be implemented in conjunction with any of the hardware components described herein, such as the computing systems described below (e.g., processing units, memory, and the like). In any of the examples herein, the inputs, outputs, engines, tree representations, and access rules can be stored in one or more computer-readable storage media or computer-readable storage devices. The technologies described herein can be generic to the specifics of operating systems or hardware and can be applied in any variety of environments to take advantage of the described features.

Client/server operation can be supported, and cloud computing techniques can be applied to give clients the ability to perform the described techniques via a local application (e.g., application 120 or some other application) without concern over the actual computing infrastructure needed or used to operate the servers, which can be administered by a business entity different from the client user organization.

Example 3

Figure 2:
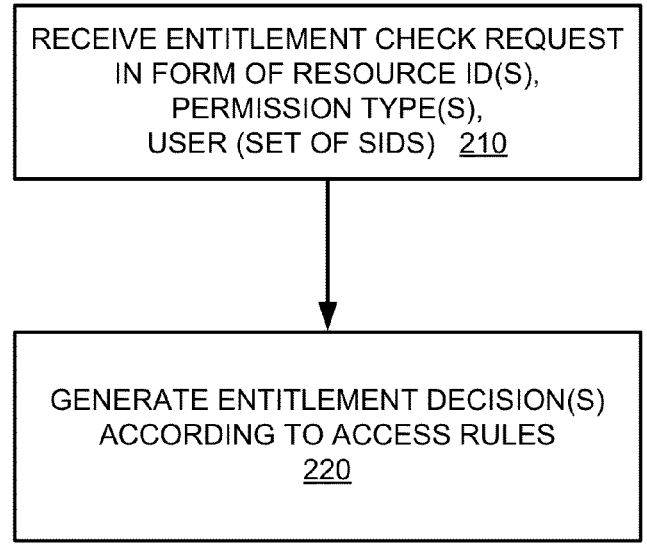
FIG. 2 is a flowchart of an exemplary method of implementing entitlements determination via access control lists.

Exemplary Method Implementing Entitlements Determination Via Access Control Lists FIG. 2 is a flowchart of an exemplary method 200 of implementing entitlements determination via access control lists and can be implemented, for example, in the system shown in FIG. 1.

At 210, an entitlement check request in the form of one or more resource identifiers is received. As described herein, the request can also include one or more permission types and an indication of a user (e.g., a set of one or more security identifiers) is received. As described herein, the permission types and user are optional and can sometimes be assumed based on context.

At 220 one or more entitlement decisions are generated according to access rules stored for the resources identified by the resource identifiers. An entitlement decision indicates whether or not a user (e.g., user identifier) has access to a resource. As described herein, the resource identifiers can be mapped to resource ranges in the entitlement space. A resource range can then be compared to permitted ranges in the entitlement space.

As described herein, the rules can be organized as respective rule ranges (e.g., between two rational numbers) in an entitlement space. An entitlement check can be processed according to the rule ranges.

Additional processing (e.g., to determine permitted ranges according to an underlying hierarchical tree representation of the access rules) can occur as described herein.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4

Exemplary Resources

In any of the examples herein, a resource can be any logical unit to which access can be granted. For example, content units (e.g., documents, posts, files, pages, screens, folders, or the like), functional units (e.g., ability to access a device, ability to log in, ability to power up, etc.), physical areas (e.g., ability to enter a room, etc.) or other logically definable units can be resources in the examples herein. An entitlement system need not address the details of resources, other than that they have a resource identifier.

Example 5

Exemplary Resource Identifiers

In any of the examples herein, a resource can be specified (e.g., indicated) by a resource identifier, which can take any of a variety of forms that can be stored in computer-readable storage media.

Example 6

Exemplary Security Identifiers

In any of the examples herein, a security identifier (SID) can be used to indicate an identity of a user, group, or other logical identity unit. For example, in practice, a user identity can be represented by a set of one or more security identifiers. Such security identifiers can comprise the groups of which the user is a part (e.g., employee, engineer, accounting, executive, or the like).

In any of the examples herein, the security identifier can be assumed or implied and need not be explicitly specified by a requesting application. For example, when a request is made by or on behalf of a particular user, the security identifiers associated with the user can be assumed or acquired from context.

When performing an entitlement check, one or more security identifiers can be received. The entitlement decisions are typically generated based on whether the access rules permit access by any of the security identifiers (e.g., a most permissive approach is used).

Example 7

Exemplary Permission Types

In any of the examples herein, a permission type can indicate one of a plurality of permission types for a resource. For example, in the case of content, types such as read, write, edit, delete, or the like can be used. Other types, such as execute, power up, or the like can also be supported.

Permission classifiers can be used to operate on (e.g., further specify and characterize) a permission type. For example, a resource type, document type, or the like can be specified (e.g., "edit post" or "read document"). A classifier of "default" can be used to allow access to any resource type. When determining permissions, the permissions for particular classifiers and the default can be combined (e.g., separate trees can be maintained for default and other permission classifiers).

In any of the examples herein, the permission types can be assumed and need not be expressly expressed. For example, certain kinds of access to resources, or certain resources may involve a single assumed permission type. Or, permission type can be determined by context.

Implicit permission types can also be supported. For example, a grant of edit may also imply a grant of read.

When performing an entitlement check, one or more permission types can be received. The entitlement decisions are typically generated based on whether the access rules permit access by any of the permission types (e.g., a most permissive approach is used).

Example 8

Exemplary Entitlement Space

In any of the examples herein, an entitlement space can be defined that specifies permissions in linear space. As described herein, ranges between rational numbers in the entitlement space can be used to advantage. An underlying tree representation of access rules can be converted to one or more permitted ranges (e.g., segments in the entitlement space).

A resource can also occupy a range in the entitlement space. Determining whether access is permitted can then be accomplished by checking the resource range against the permitted ranges.

Although some examples show the entitlement space spanning a certain numerical range (e.g., 0 to 1), in practice, any range can be supported. Due to the density of rational numbers, remaining rational numbers can endlessly be generated to fall within the bounds of two other rational numbers. Further, if chosen as described herein, room remains at any level in the hierarchical representation to add unlimited additional children without running out of room in the entitlement space.

Example 9

Exemplary Access Rules

In any of the examples herein, an access rule can grant or revoke access to a security identifier (e.g., according to a permission type). For example, an access rule can specify {Grant, Bob, Read} to grant read access to the security identifier Bob. Resources can be bound to the access rules via a mapping from a resource identifier to a location (e.g., tree node identifier) in the underlying tree representation of the access rules. Access rules from the path traversed from the root to the location apply to the resource at the location. Processing order can be taken into consideration (e.g., permissions granted at the top of the tree can be overridden by later rules at lower levels in the hierarchy).

Different implementations can implement access rules differently. For example, some systems may not have a need for permission types, others may have simple user identifiers instead of security identifiers, or the like.

Example 10

Exemplary Ranges in Entitlement Space

In any of the examples herein, a range in the entitlement space can be a range between two rational numbers in the entitlement space. However, the technologies described herein can take advantage of certain mathematical properties when choosing such ranges so that certain ranges can be uniquely (e.g., unambiguously) represented by a single rational number as described herein. Further, the rational number can uniquely indicate a tree node identifier in an underlying hierarchical tree representation of the access rules. Such a tree node identifier can uniquely (e.g., unambiguously) position the node at a location in the underlying tree. Other properties of the rational number allow easy determination of a path from the represented node to the root of the tree. Ancestors of the node in the tree can also be determined via an Extended Euclidean algorithm.

Thus, the range can be represented and interpreted differently depending on the scenario under which it is used. The multi-faceted interpretation of the range can be put to use to assist in entitlements processing as described herein.

Thus, a range can represent a location of an access rule in a hierarchical tree arrangement. In some cases, a node may not have an associated rule (e.g., or have a NULL rule), but can still have a location in the tree. In practice, most nodes may not have an associated rule (e.g., but can be associated with a resource), leading to superior performance. Thus, the hierarchical tree arrangement can contain nodes for resource identifiers and also store nodes for access rules to control access to the resources represented by the resource identifiers. If desired, a node can represent both an access rule and a resource.

In practice, a single rational number (e.g., an integer pair representing a numerator and denominator) can represent the range. As described herein, the rational number that represents the upper bound of a range can uniquely designate the range and be used to represent the range. A mediant-based calculation can be used to support such an arrangement. The single rational number can be used as a tree node identifier to uniquely identify a node in an underlying tree representation of access rules (e.g., whether the identifier is used to identify a resource range or a rule range).

Alternatively, continued-fraction form as described herein can be used. The continued-fraction form is an equivalent, unique representation of the single rational number and thus can be used to uniquely (e.g., unambiguously) identify a given range in the entitlement space.

A modified version of the continued-fraction form can indicate a series of integers that specify a path in a hierarchical tree representation as described herein. The modified version of the continued-fraction form is an equivalent, unique representation of the single rational number.

Example 11

Exemplary Access Rule Ranges

As described herein, an access rule can be represented as rule range (e.g., a range in the entitlement space that is chosen according to the techniques described herein and can be uniquely represented by a single rational number). Such a representation allows the access rules to be processed to generate the permitted ranges as described herein. A rule range can represent a location of the rule in a hierarchical (e.g., tree) arrangement.

Example 12

Exemplary Resource Range in Entitlement Space

In any of the examples herein, a resource range can be a range in the entitlement space (e.g., can be uniquely represented by a single rational number). The range used for a resource range can be that of a rule range (e.g., the resource is associated with an access rule in the tree).

A tree node identifier denoting a resource range can thus doubly function as a rule range identifier that identifies a range in the entitlement space.

As described herein, a resource identifier can be mapped to a range that is associated with a node in the underlying tree representation of the access rules.

Example 13

Exemplary Entitlement Decisions

In any of the examples herein, an entitlement decision can specify whether access to a resource is allowed. Processing of the decision can take place internally or externally to an entitlements engine. In practice, a simple (e.g., Boolean) decision can be indicated to specify whether access is permitted (e.g., true) or not permitted (e.g., false). When batch processing is performed, a batch of decisions can be generated as a result (e.g., specifying decisions for respective resources).

Example 14

Figure 3:
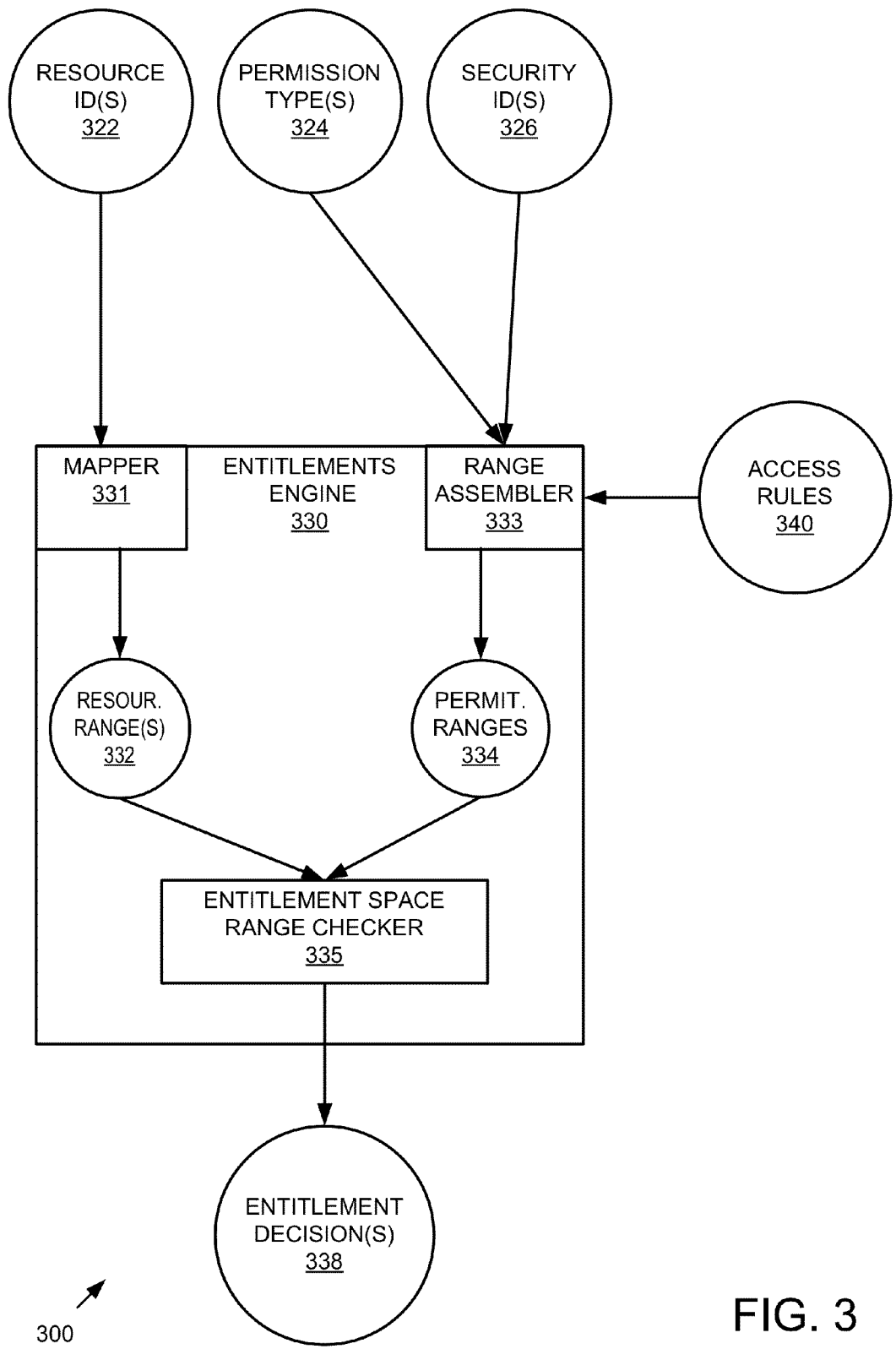
FIG. 3 is a block diagram of an exemplary system comprising an entitlements engine with an entitlement space range checker.

Exemplary System Implementing Entitlements Determination via Access Control Lists FIG. 3 is a block diagram of an exemplary system 300 comprising an entitlements engine 330 with an entitlement space range checker 335. In the example, the entitlements engine 330 accepts one or more resource identifiers 322, one or more permission types 324, and one or more security identifiers 326 as input. The engine 330 can output one or more entitlement decisions 338 that indicate whether the user identified by the security identifiers 326 has permission of the permission types 324 to access the resources indicated in the resource identifiers 322. For example, the entitlement decisions 338 can indicate whether a user has access to respective resources identified by the resource identifiers 322.

Components shown as being in the entitlements engine 330 can be implemented external to the engine 330 if desired, and additional functionality can be included in the engine 330.

The entitlements engine 330 can include a mapper 331 that maps a resource identifier to a resource range 332 in the entitlement space. For example, a plurality of resource identifiers 322 can be mapped to respective ranges 332. In practice, a resource can be assigned a unique range (e.g., fully enclosed by its parent(s) range(s)). Alternatively, different resource identifiers can be mapped to a same range in the entitlement space. To facilitate mapping, the mapper can employ a table mapping a particular resource identifier to a resource range in entitlement space as described herein.

The range assembler 333 can construct permitted ranges 334 in the entitlement space according to the permission types 324, security identifiers 326, and the access rules 340.

Given the resource ranges 332 in entitlement space and the permitted ranges 334 in entitlement space, the entitlement space range checker 335 is able to generate entitlement decisions 338. If a resource range overlaps a permitted range, access is authorized, and an affirmative (e.g., TRUE) decision can be generated.

Example 15

Exemplary Method Determining Entitlement Decisions via an Entitlement Space

Figure 4:
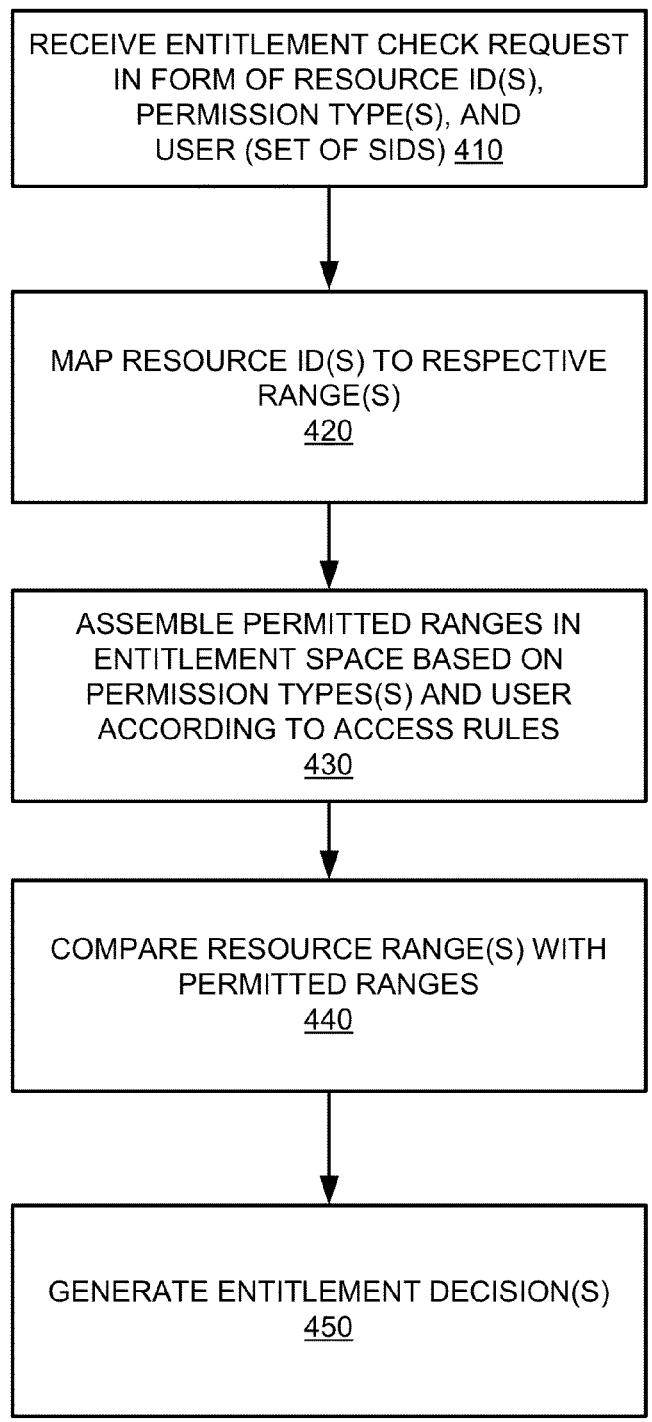
FIG. 4 is a flowchart of an exemplary method of determining entitlement decisions via an entitlement space.

FIG. 4 is a flowchart of an exemplary method 400 of determining entitlement decisions via an entitlement space and can be implemented, for example, via the system shown in FIG. 4.

At 410, an entitlement check request is received in the form of one or more resource identifiers, one or more permission types, and an indication of a user (e.g., one or more security identifiers).

At 420 the resource identifiers are mapped to respective resource ranges in the entitlement space.

At 430, permitted ranges are assembled in the entitlement space based on the permission types and user according to the access rules. The permitted ranges can be reused for different resource ranges (e.g., as long as authorization is being done for the same user and permission types).

At 440, the resource ranges in the entitlement space are compared with the permitted ranges in the entitlement space.

At 450, based on the results of the comparison, entitlement decisions are generated. As described herein, a batch of resource identifiers can be processed at once, reusing the assembled permitted ranges.

Example 16

Exemplary System Implementing Entitlements Engine for Content Units

Figure 5:
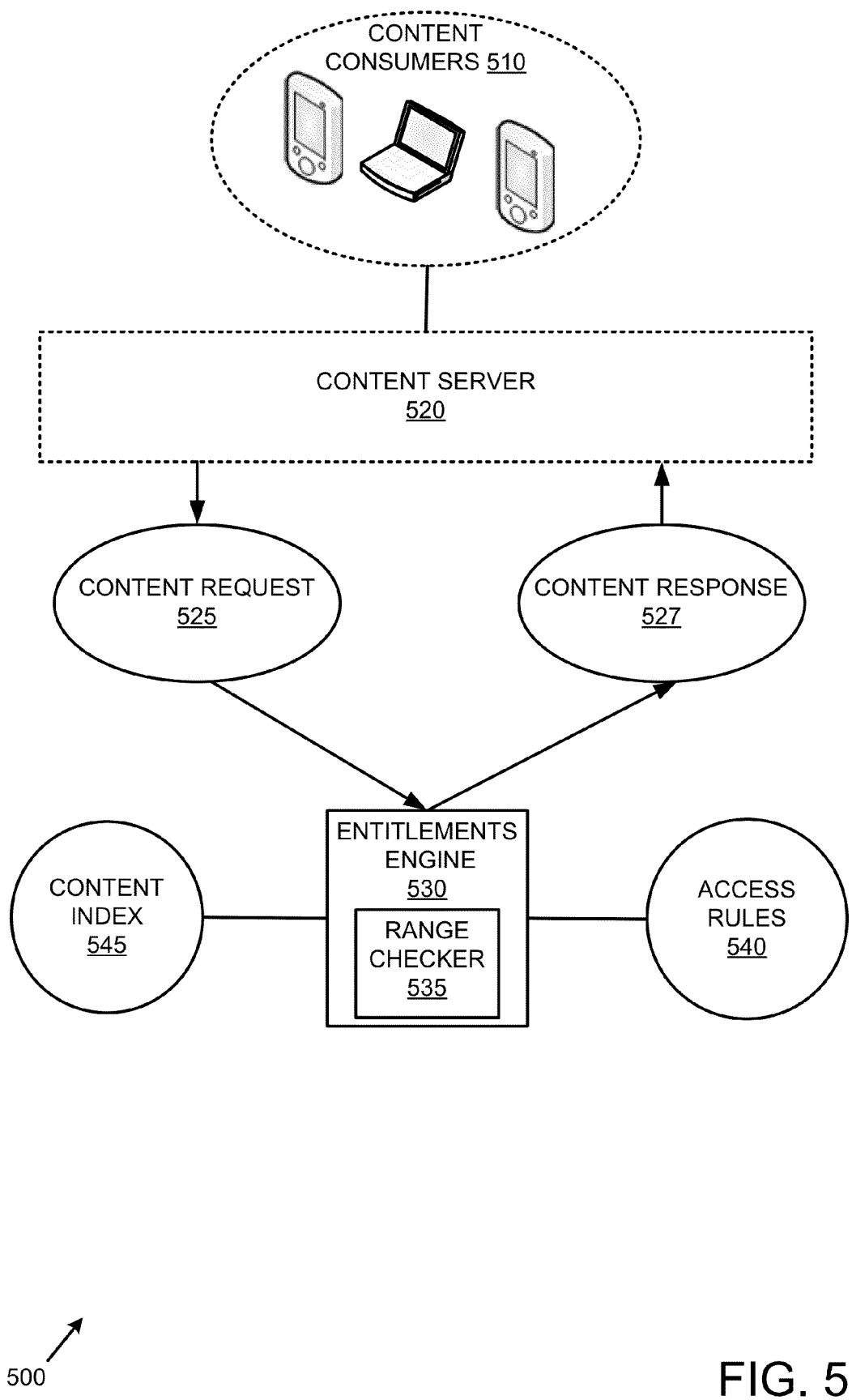
FIG. 5 is a block diagram of an exemplary system implementing an entitlements engine for content units.

The technologies described herein can be applied to a variety of resources. For example, the technologies can be implemented in a content scenario serving content units. FIG. 5 is a block diagram of an exemplary system 500 implementing an entitlements engine for content units. For context purposes, a plurality of content consumers 510 is shown accessing a content server 520 that avails itself of the entitlements engine 530. In practice, the content server 520 can be any of a variety of software systems that provide any of a variety of content (e.g., providing search functionality, browse functionality, and the like).

The entitlements engine 530 accepts a content request 525, which can comprise a plurality of requests for respective content units.

The entitlements engine 530 is configured to map the content identifiers to respective ranges in the entitlement space with assistance of a content index 545. In practice, the content index 545 can be maintained by another tool, the content server 520 (e.g., as a private property of the content protected from unauthorized alteration), or the like.

A range checker 535 can operate as described herein to check ranges according to the access rules 540 against the ranges indicated for content in the content index 545.

A content response 527 can be generated according to the entitlement decisions coming from the entitlements engine 530. The content response 527 can provide the content units for which the user is permitted by the user on whose behalf the content is requested.

Example 17

Exemplary Method Enforcing Access Rules for Content

Figure 6:
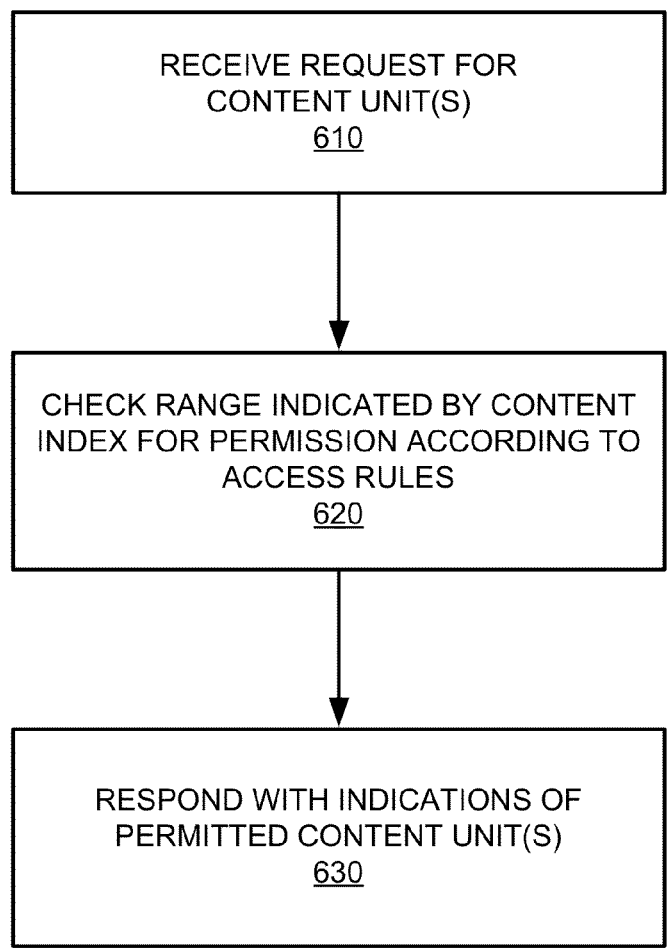
FIG. 6 is a flowchart of an exemplary method of enforcing access rules for content.

FIG. 6 is a flowchart of an exemplary method 600 of enforcing access rules for content and can be implemented, for example, via the system shown in FIG. 5.

At 610, a request for one or more content units is received. As described herein, the request can also comprise an indication of one or more permission types, and an indication of a user for whom the content is being requested.

At 620, the range indicated in the content index is checked for permission according to the access rules. Permitted ranges can be constructed as described herein and reused for multiple checks on behalf of the same user.

At 630, a response indicates the permitted content units. In practice, the permitted content units can simply be provided, or identifiers for accessing them can be provided.

Example 18

Exemplary Early Binding System

In some entitlement scenarios, it may be desirable to incorporate the access rules into a query (e.g., rather than filtering a list of requested resources, the filter is integrated into the request). Such an approach is sometimes called an "early binding" approach because the access rules are bound to potential resource identifiers before an entitlement check request is made. In such a case, a resource query can return an answer to "what resources does the user have access to."

Early binding implementations can perform entitlement checks inside the storage engine. Representations (e.g., tables) of the resources and the lineage of nodes representing resources in an underlying hierarchical representation can be used as part of queries as described herein.

Figure 7:
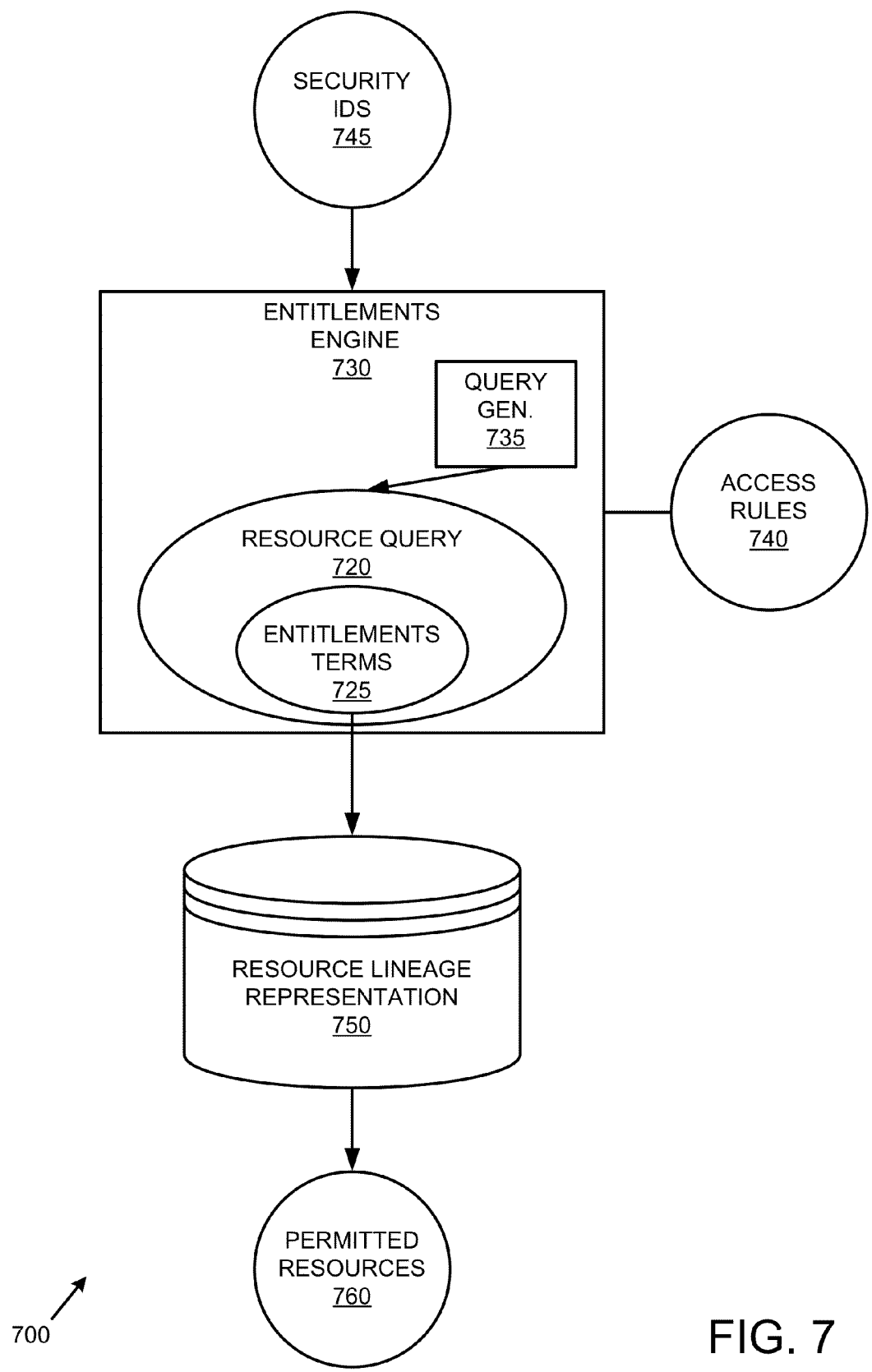
FIG. 7 is a block diagram of an exemplary system comprising an entitlements engine in a late binding scenario.

FIG. 7 is a block diagram of an exemplary system 700 comprising an entitlements engine 730 in an early binding scenario. In the example, a resource query 720 is directed to a resource lineage representation 750 to determine which resources meet the criteria specified in the query 720. The resource lineage representation 750 can store the nodes corresponding to resources (e.g., a resource identifier for a given node) and their lineage (e.g., resource identifiers for a given node's parents) in the underlying hierarchical representation. The resource lineage representation 750 can be updated when a new resource identifier is created (e.g., a node is created in the tree), when the rules 740 are updated, and the like. Because of the way the tree is constructed, parents of a node can be determined mathematically (e.g., from the tree node identifier) without having to explicitly construct the tree representation.

The entitlements engine 730 can comprise a query terms generator 735 that generates entitlements terms 725 to include in (e.g., add to) the resource query 720, thus limiting the returned resources to only those that are permitted 760 by the access rules 740 (e.g., for the user specified in one or more security identifiers 745). The entitlements terms 725 can be a representation of the access rules 740 (e.g., the grants to the user in question). Although not shown, one or more permission types can also be provided as input to the query engine 730.

The query 720 can incorporate any arbitrary query terms in an underlying query to limit the results 760 returned. In some cases, the underlying query 720 may be empty (e.g., only entitlements terms are included). If so, the list of resources (e.g., all resources) to which the user has authorized access (e.g., according to the permission types) is returned.

Example 19

Exemplary Early Binding Method

Figure 8:
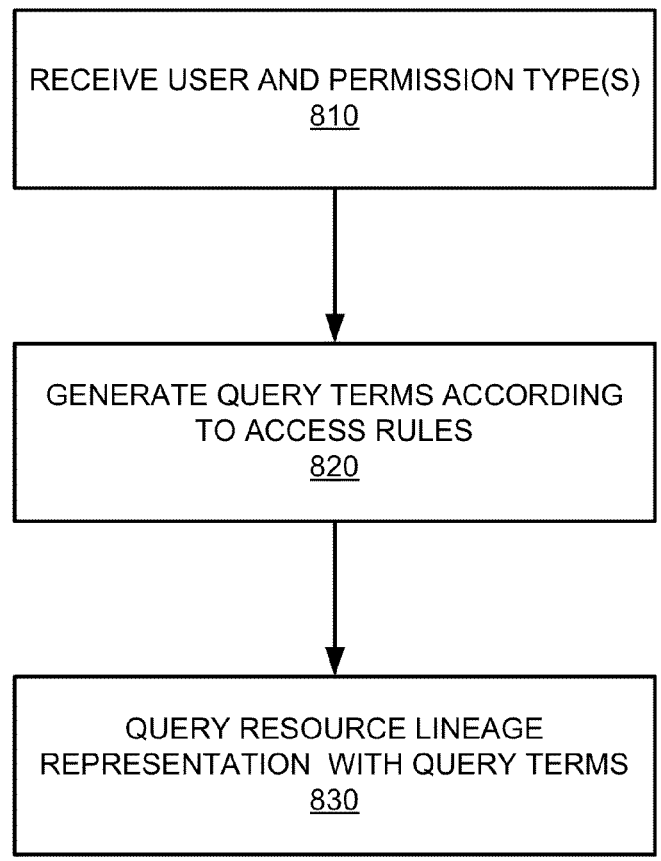
FIG. 8 is a flowchart of an exemplary method of checking entitlements in a late binding scenario.

FIG. 8 is a flowchart of an exemplary method 800 of checking entitlements in an early binding scenario and can be implemented, for example, in a system such as that of FIG. 7. A resource lineage representation can be constructed and maintained in advance of performing the method.

At 810, a user identifier (e.g., set of security identifiers) and permission type are received. The user identifier (e.g., identifying a user) is requesting access to resources.

At 820, one or more query terms for limiting returned resources to those for which the user identifier has access according to the permission types are generated. As described herein, access rules organized as respective ranges in an entitlement space can be consulted. The query terms limit access to authorized resources (e.g., authorized to the user identifier) as indicated by the access rules.

The query terms can be generated by including a list of the locations (e.g., tree node identifiers) where grants exist in the rules for the user identifier and permission type.

The query terms can then be included in queries of the resources to determine which resources the user identifier has access to. When the query is placed against the resource lineage representation, the returned resources will be limited to those to which the user identifier has authorized access (e.g., according to the permission types).

In practice, some query languages (e.g., SQL) may encounter limitations, so search technologies (e.g., from the LUCENE™ project, or the like) can be implemented.

Example 20

Exemplary Access Rules Representation

Figure 9:
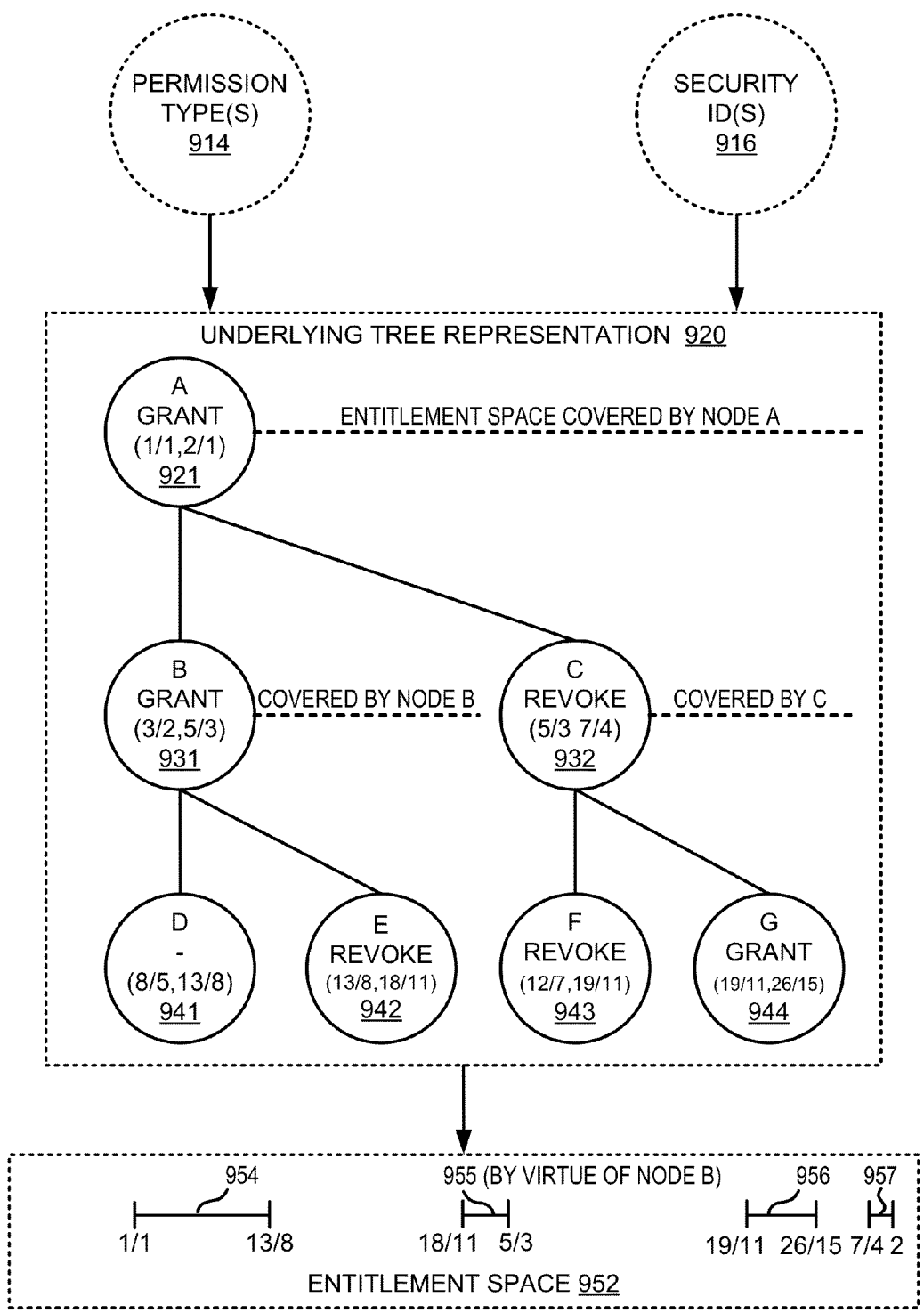
FIG. 9 is a block diagram of an exemplary relationship between a tree representation of access rules and entitlement space.

FIG. 9 is a block diagram of an exemplary relationship between an underlying tree representation 920 of access rules and the resulting entitlement space and can be used in any of the examples herein processing access rules.

For convenience of illustration, the security identifiers and permission types are not shown. However, in practice, the hierarchical tree 920 can define permitted ranges in the entitlement space for a plurality of permission types, a plurality of security identifiers, or both. Thus, the tree effectively defines permitted ranges in the entitlement space for any given set of permission types and any given set of security identifiers.

Although open-open ranges are shown. Closed-open or closed-closed implementations can be supported.

Although ranges are shown in the nodes as two rational numbers, access rules in the tree can be associated with a single rational number that uniquely position the access rules in the hierarchy. Due to the way that the access rules are represented, entitlements checks can be performed without direct reference to the tree structure and without having to navigate through the tree. However, the underlying tree structure provides a conceptual basis by which the entitlement space can be managed and interpreted. In any of the examples herein, a resource can be associated with a particular node 921, 931, 932, 941, 942, 943, 944 in the tree representation (e.g., by virtue of being associated with the range indicated by the node). More than one resource can be associated with a given node. For expository convenience, the representation of the entitlement space 952 is not to scale (e.g., the ranges and the endpoints are not to scale).

In the example, ranges 954, 955, 956, 957 in an entitlement space 952 are generated with reference to a set of access rules having an underlying hierarchical tree representation 920, for one or more permission types 914 and one or more security identifiers 916.

In the underlying tree representation 920, nodes in the tree can represent a grant or revoke of one or more permission types for one or more security identifiers. Although other arrangements are possible, in the example, the hierarchical arrangement is interpreted so that lower levels in the hierarchy override higher levels (e.g., the root can be overridden by a lower level node, which itself can be overridden by a still lower level node, and so forth).

A tree node in the hierarchical representation 920 indicates a range between two rational numbers in the entitlement space. For example, the root A 921 indicates an open range from 1 to 2. In some examples, closed ranges can be used instead. A tree can have multiple roots (e.g., with ranges from 0-1, 1-2, 2-3, and the like).

Children under a node fall completely within the entitlement space of their parent, but do not fully cover it. The rule range of a child rule is fully overlapped by that of a parent rule in the entitlement space, and the child rule overlaps no other rules at the parent rule level. Thus, the nodes B 931 and C 932 overlap the entitlement space of their parent A 921. However, there is still some remaining uncovered space beyond that covered by the last child (e.g., node C 932, between 7/4 and 2). An endless number of children can be added to the parent without fully covering the entitlement space of the parent. In practice, a child can be added to a parent by inserting a range spanning from after the last child to a point between the endpoint of the last child and the endpoint of the parent. For example, a mediant-based calculation can be used. Thus, if another child were to be added to the parent A 921, it would span from 3/4 to 4/5 because $((3+1)/(4+1))=4/5$. Thus, the rule range of a child rule in the entitlement space can be computed according to a technique that supports endlessly adding additional sibling rules for the child rule (e.g., and endlessly adding grandchild rules, and so forth).

When adding a first child to a parent, some space between the parent's left side and the first child's right can be reserved (e.g., unused by children) as shown in the example (e.g., the space between 1/1 and 3/2 is reserved when adding B to A). So, the range of a first child can be computed by performing a mediant-based calculation on the parent's left and the parent's right for the left-hand side of the first child, and then performing a mediant-based calculation on the first child's left-hand side and the parent's right-hand side for the right-hand side of the first child. Other arrangements are possible.

The hierarchical nature of the representation 920 means that the properties propagate recursively throughout the tree. For example, the range of any grandchild nodes 941, 942 not only fall completely within the entitlement space of their parent B 931, but also fall completely within the entitlement space of their grandparent 921. Due to the properties of the representation 920, a definitive set of ranges 954, 955, 956, 957 can be constructed for the permission types 914 and security identifiers 916 in the entitlement space 952, allowing rapid check of whether a user is entitled to access a resource associated with a node in the tree 920, even without reference to the tree 920 or having to traverse it.

Further, in the hierarchical arrangement, the rule ranges of access rules in a same level of the hierarchical arrangement are non-overlapping in the entitlement space. In other words, siblings do not overlap. If overlap is desired, a child can be created. Any of a variety of arrangements are possible. For example, a parent can be created for two children to live under.

The endpoints of any ranges are rational numbers. The fractions (e.g., single rational number represented by an integer numerator and integer denominator) generated can be those generated using continued-fraction form.

In the example, an entitlement space 952 has been constructed assuming that the nodes shown relate to a particular security identifier and a particular permission type. In practice, the nodes can represent grants and revokes to a mix of security identifiers and permission types; filtering can therefore be performed beforehand. For example, the node D 941 can be for a different permission type, and therefore does not affect the entitlement space 952.

The permitted ranges in the entitlement space 952 can be constructed with reference to information represented by the nodes. In the example, a permitted range 954, 955, 956, 957 indicates that permission is present (e.g., the user is entitled to access the resource according to the permission types 914). Because resources themselves can be associated with a node, they are associated with a range in the entitlement space. Overlap between the resource and permitted ranges indicates that access is permitted. In practice, there can be numerous grants and revokes that do not pertain to the user, so the entitlement space can become more complex.

In practice, filtering can reduce the number of rules considered when building the permitted ranges in an entitlement space. Those access rules that do not apply to the indicated permission types and security identifiers can be ignored (e.g., but can be used for entitlement checks for other users and/or permission types). Thus, the resulting nodes may be disconnected nodes in the tree.

As shown in the example, the root A 921 spans from 1 to 2. However, some ranges in the entitlement space are excluded via revokes 932, 942, 943. A resource associated with the root 921 would be considered to be accessible because the range ending at 2 (e.g., spanning 7/4 to 2) is present in the permitted ranges of the entitlement space 952. Regardless of the number of nodes added to the tree, there will be a range, however small, from $1+(x/(x+1))$ to 2. The root 921 can be uniquely identified by the upper bound (e.g., 2) of its range, which can serve as the tree node identifier for the node 921 (e.g., which can be used to indicate that a resource is associated with the node 921 in the underlying representation 920).

Alternatively, because space can be reserved between the parent's left side and the first child's right (e.g., to prevent child-parent overlap), the lower bound of the range can also be used as the tree node identifier for the node.

Example 21

Exemplary Equivalent Representations of Tree Node Identifier

In FIG. 9, the node G (944) can be represented by a tree node identifier of 19/11, which is a single rational number that identifies the range from 19/11 to 26/15. The path from G to A is 1, 2, 2. A modified version of the path includes extra alternating 1's and is therefore [1,1,2,1,2] (or 1+[1,2,1,2]), which can be used as the continued-fraction form equivalent of the tree node identifier for G, which is calculated as follows:

$$1+1/(1+1/(2+1/(1+1/2)))=19/11$$

Thus, the single rational number (e.g., 19/11) represents a unique (e.g., unambiguous) position within the tree. The Extended Euclidean algorithm can find the ancestors based on the fraction 19/11. A mediant-based calculation can be used to determine the next sibling to be added at a hierarchical level as described herein.

Example 22

Exemplary System Filtering Access Rules

Figure 10:
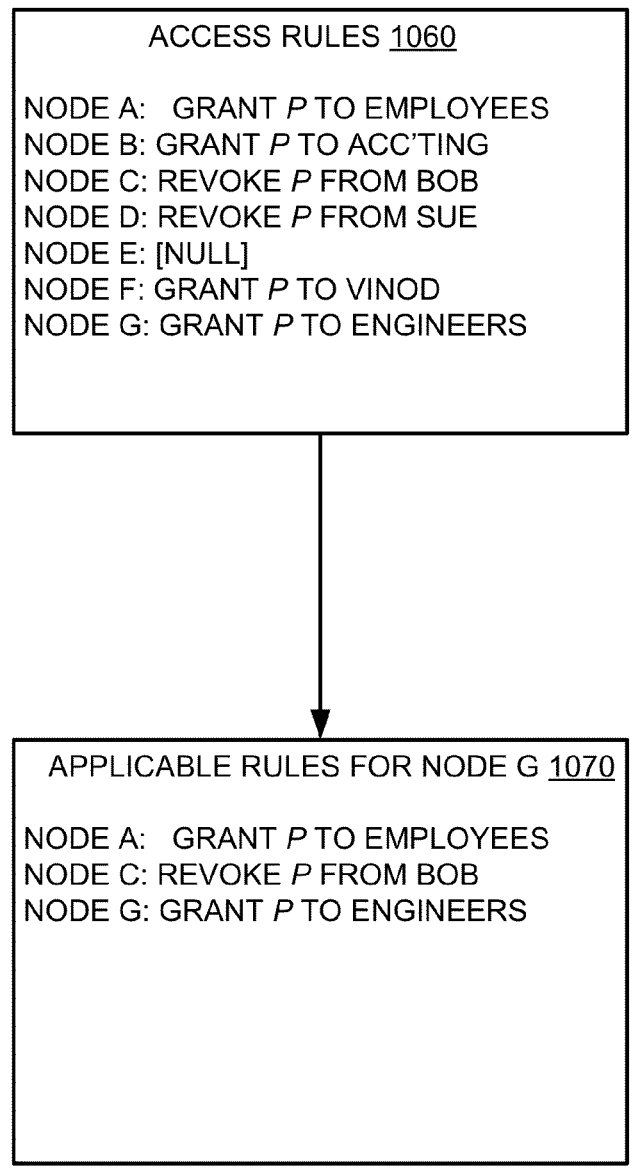
FIG. 10 is a block diagram of an exemplary filtering of access rules.

FIG. 10 is a block diagram of an exemplary filtering of access rules 1060 to those 1070 applicable for a particular node (e.g., node G 944). In practice, such explicit filtering need not be done because the permitted ranges represent the permitted ranges, regardless of which node a resource is associated with. However, the example shows conceptually which rules apply to a resource associated with a particular node.

In practice, the access rules 1060 can be ordered by depth in the hierarchical tree. Such ordering can be physical or logical.

In the example, the rules that apply are those at nodes A, C, and G in FIG. 9. Because the rules 1070 are interpreted according to depth, the resulting permissions mean that users in Employees have access to the resource, except for Bob. However, if Bob is in Engineers, he then does have access because node G overrides node C. The permitted ranges in the entitlements space can be constructed accordingly.

Example 23

Exemplary Mediant-Based Calculation

In any of the examples herein, a mediant-based calculation can be used to find a rational number between one endpoint (e.g., of a parent) in the entitlement space and another endpoint (e.g., of a sibling) in the entitlement space. Such a calculation can ensure that the rational number uniquely identifies the range of the resulting node in the hierarchical representation. Also, given any two rational numbers $R_1$ and $R_2$, where $R_1<R_2$, the following holds true: $R_1<$mediant-based-calculation$(R_1,R_2)<R_2$. Other similar functions can be used.

A sample mediant calculation follows:

For a rational number between a parent with range ending at $x_1/y_1$ and sibling ending at $x_2/y_2$, a mediant calculation can take the form of:

$$(x_1+x_2)/(y_1+y_2)$$

The resulting range can then be that between the sibling ending point and the result of the mediant calculation. The range is uniquely identified by the result of the mediant calculation. Alternative representations, such as continued-fraction form, or a series of integers can be used. If used, zero can be represented as a rational number (e.g., consistently 0/1, 0/2, or the like).

The result of the mediant calculation can be used to identify the resulting range as a tree node identifier, or the like. The parents of the node can be identified via the result.

Example 24

Exemplary Entitlements Engine Implementation

Figure 11:
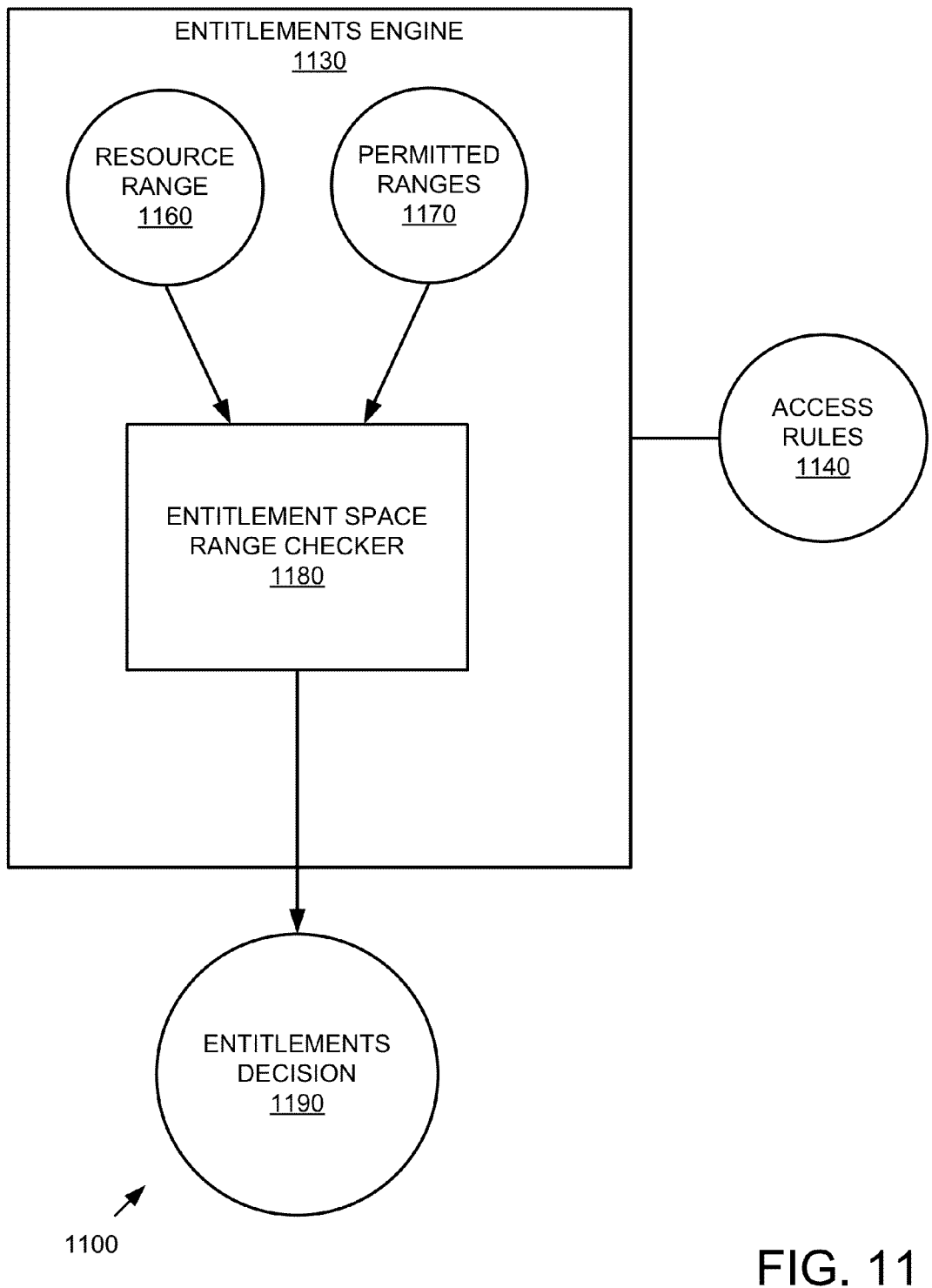
FIG. 11 is a block diagram of an exemplary system comprising an entitlements engine implementing an entitlement space range checker.

FIG. 11 is a block diagram of an exemplary system 1100 comprising an entitlements engine implementing an entitlement space range checker 1180. In the example, the entitlement space range checker 1180 accepts a range 1160 in the entitlement space associated with a resource and one or more permitted ranges 1170 in the entitlement space, which are constructed with reference to the access rules 1140.

The entitlement space ranger checker 1180 checks for overlap between the resource range 1160 and the permitted ranges 1170. An entitlements decision 1190 reflects the outcome of the check. If there is overlap, access is permitted.

In practice, a rule can be associated with more than one user.

Example 25

Exemplary Entitlement Space Checking

Figure 12:
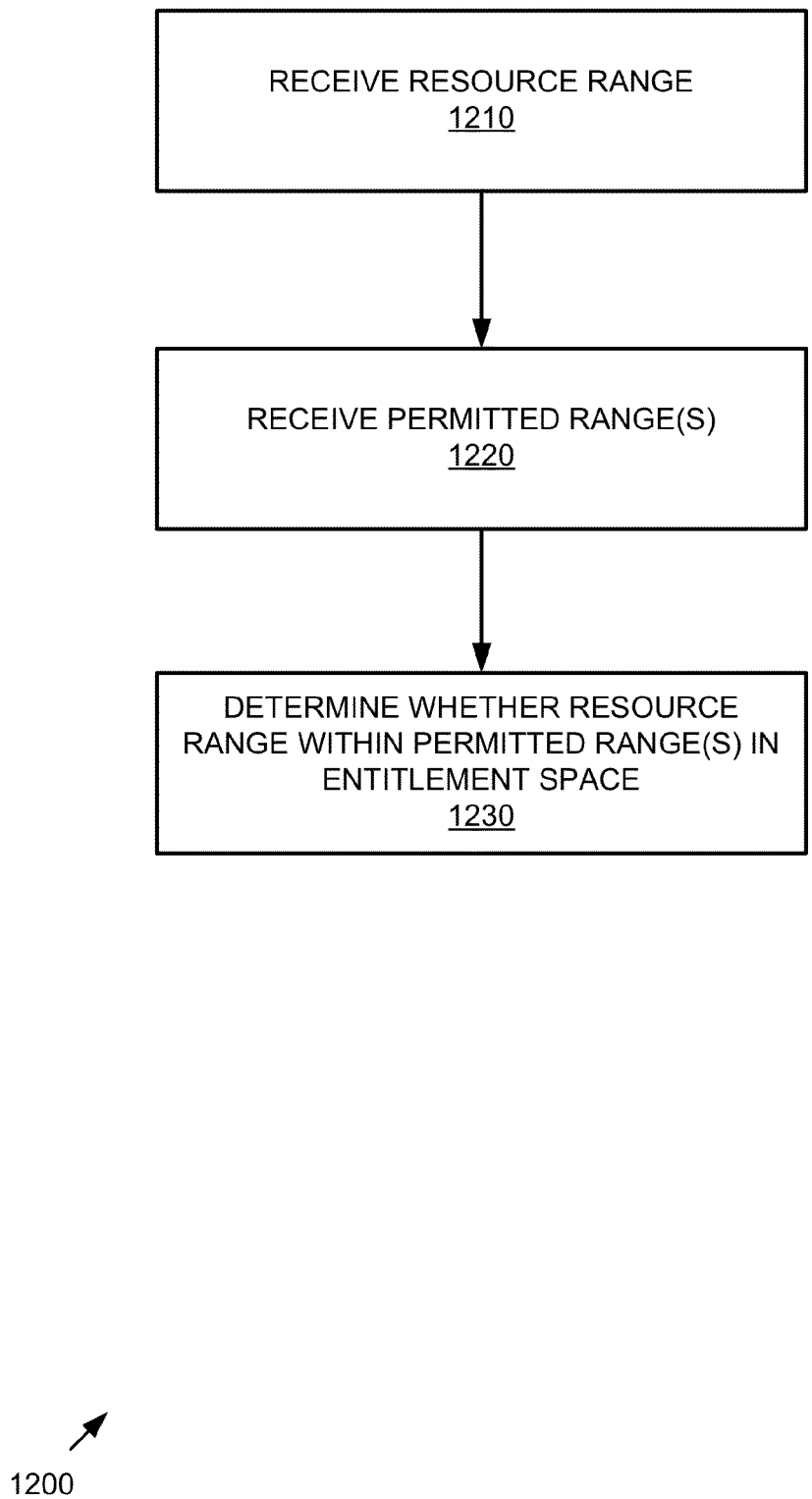
FIG. 12 is a flowchart of an exemplary method of checking entitlement space.

FIG. 12 is a flowchart of an exemplary method 1200 of checking entitlement space and can be used, for example, in a system such as that shown in FIG. 11.

At 1210, a range associated with a resource is received. If more than one resource is being checked, there can be more than one range (e.g., a range per resource).

At 1220, the permitted ranges are received. Such ranges can be determined for the entitlement space and reused for a batch of resource entitlement checks.

At 1230, it is determined whether the resource range is within a permitted range in the entitlement space.

Such an approach is sometimes called a "late binding" approach because the access rules are bound later (e.g., typically after a query is run on the resources).

Example 26

Exemplary Entitlement Space Range Builder

Figure 13:
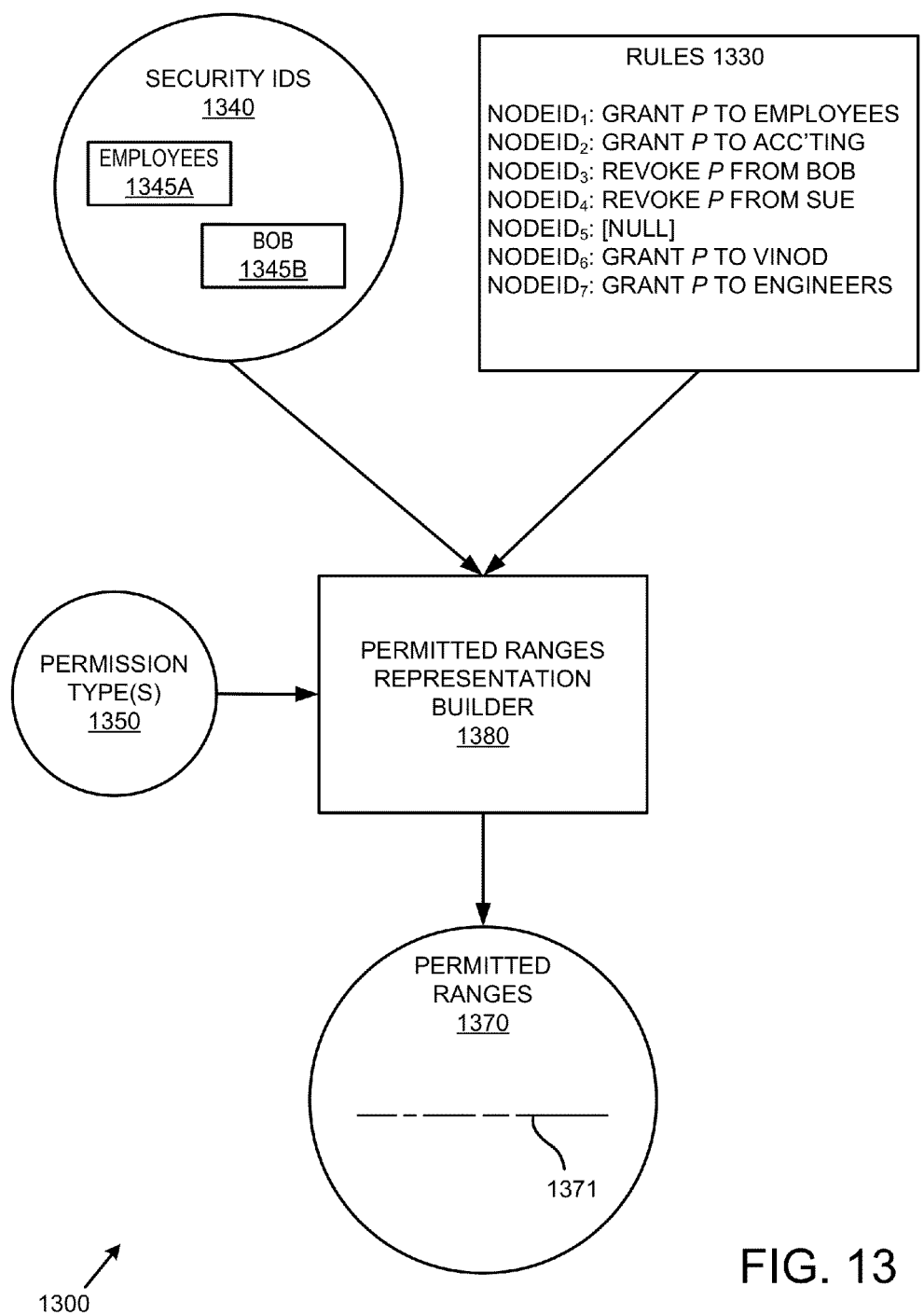
FIG. 13 is a block diagram of an exemplary system building permitted ranges in an entitlement space.

FIG. 13 is a block diagram of an exemplary system 1300 building permitted ranges 1370 in an entitlement space. In the example, a permitted ranges representation builder 1380 received one or more security identifiers 1340 (e.g., identifiers 1345A, 1345B) and the access rules 1330, along with one or more permission types 1350. The builder 1380 can be configured to filter the rules 1330 as described herein.

The builder 1380 outputs a representation of the permitted ranges 1370 that can be used for determining whether a user (e.g., represented by the security identifiers 1340) has access (e.g., according to the permission types 1350) to a resource in accordance with the rules 1330. A segment 1371 appearing in the permitted ranges indicates that resources falling within (e.g., having a resource identifier mapped to) the segment are accessible (e.g., the user has the permission type according to the rules).

As described herein, the representation 1370 can be used to perform a plurality of resource checks.

Example 27

Exemplary Entitlement Space Range Building

Figure 14:
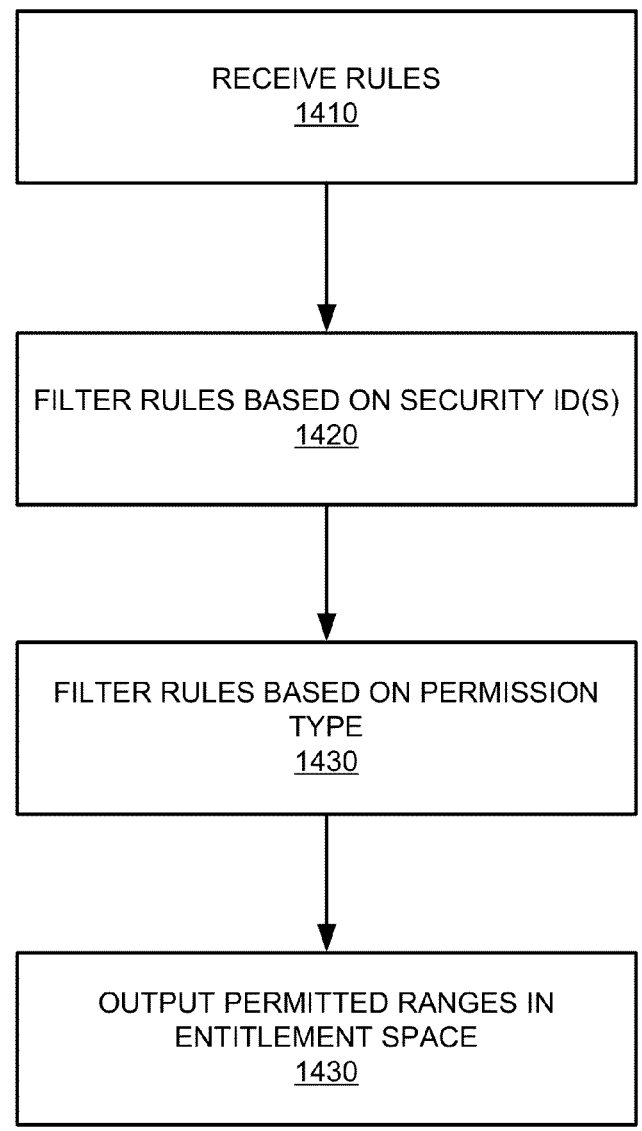
FIG. 14 is a flowchart of an exemplary method of building permitted ranges in an entitlement space.

FIG. 14 is a flowchart of an exemplary method 1400 of building permitted ranges in an entitlement space and can be implemented, for example, via the system of FIG. 13.

At 1410, the access rules are received.

At 1420, the rules are filtered based on security identifiers. For example, any rules that do not apply to the security identifiers specified as part of the access request can be removed.

At 1430, the rules are filtered based on the permission type. For example, any rules not specified as permission types in the access request can be removed. In practice, multiple passes may be done through the rules (e.g., one per permission type), or the permission types can be processed together. In systems with a single permission type, the filtering can be omitted.

At 1430, the permitted ranges (e.g., for the security identifiers and permission types) according to the rules in the entitlement space are output.

Example 28

Exemplary Range Check in Entitlement Space

Figure 15:
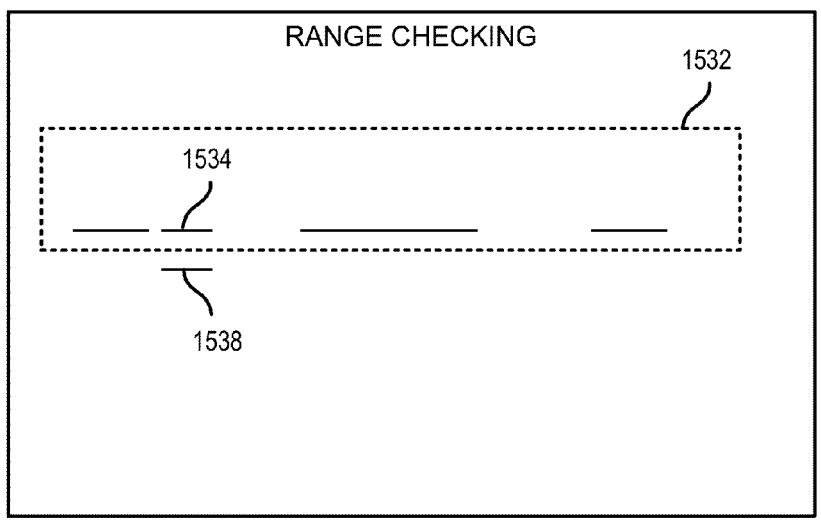
FIG. 15 is a block diagram of an exemplary system checking ranges in an entitlement space.

FIG. 15 is a block diagram of an exemplary system 1500 checking ranges in an entitlement space. In the example, a range 1538 for one resource is being checked for one set 1532 of permitted ranges (e.g., for a single user and a single permission type).

In the example, the permitted ranges 1532 include a sub-range 1534 that overlaps the range 1538 for a resource. Accordingly, access is permitted according to the ranges 1532, which are constructed according to the access rules.

As described herein, a range can be represented as a single rational number or series of integers, so the check can be done efficiently with the single rational number or series of integers.

The range 1538 can be a tree node identifier that represents a range for single node in the underlying tree representation. Some of the permitted ranges may not be representable by a tree node identifier because sub-ranges can be subtracted out (e.g., by a revoke).

Example 29

Exemplary Range Checking in Entitlement Space

Figure 16:
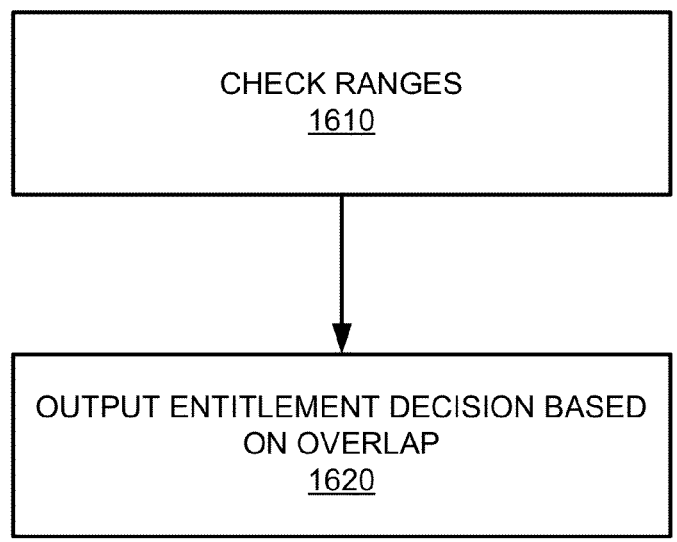
FIG. 16 is a flowchart of an exemplary method of checking ranges in an entitlement space.

FIG. 16 is a flowchart of an exemplary method 1600 of checking ranges in an entitlement space and can be implemented, for example, via the system of FIG. 15.

At 1610, the resource range and the permitted ranges are checked in the entitlement space. Such checking can include comparing the ranges to determine whether there is overlap.

At 1620, based on overlap between the ranges, an entitlement decision is output. For example, overlap indicates a positive decision (e.g., access is allowed); no overlap indicates a negative decision (e.g., access is not allowed). As described herein, the method can support implied permissions.

Example 30

Exemplary Pre-building Ranges in Entitlement Space

Figure 17:
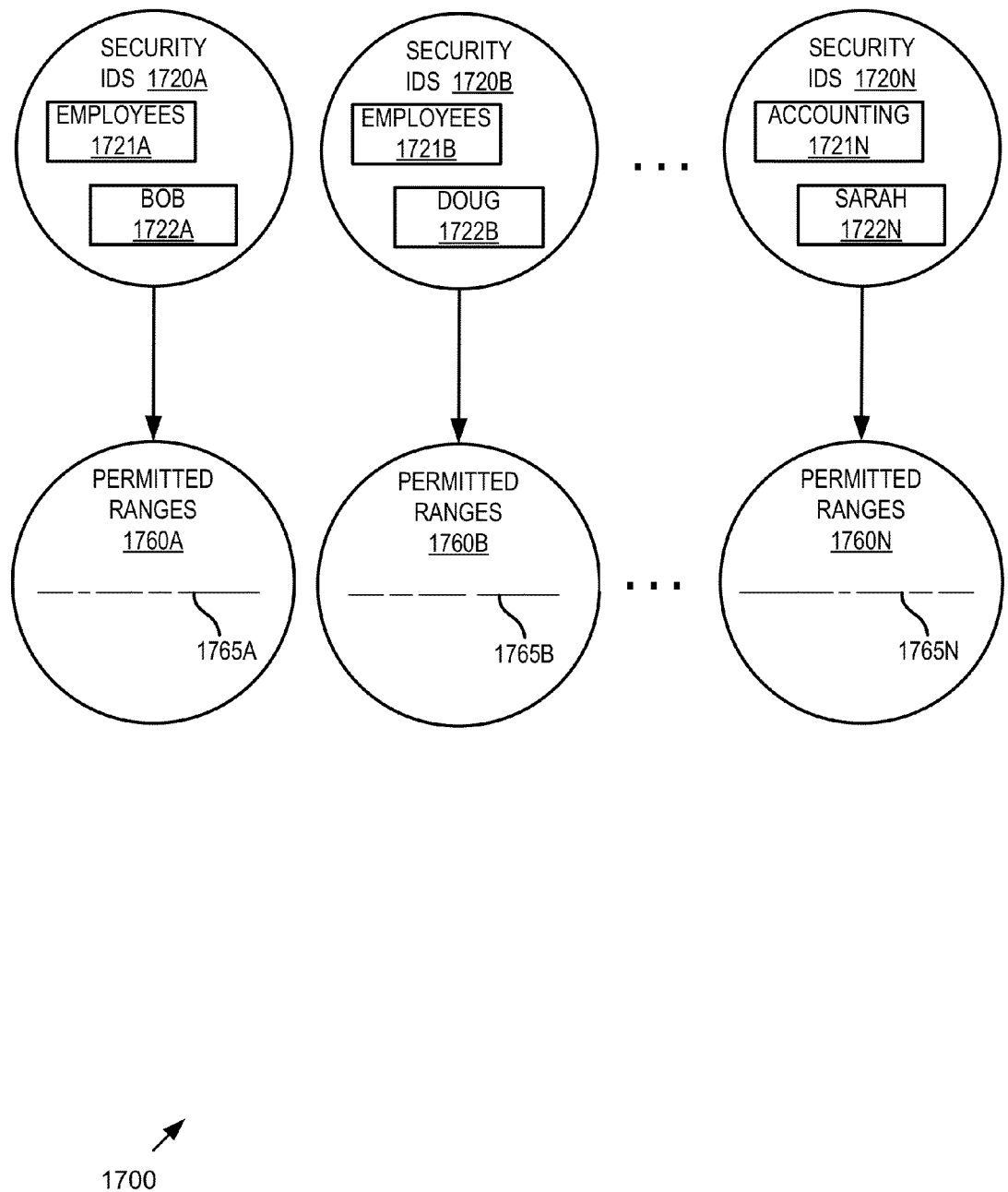
FIG. 17 is a block diagram of an exemplary system pre-building ranges in an entitlement space.

FIG. 17 is a block diagram of an exemplary system 1700 pre-building ranges in an entitlement space. In the example, permitted ranges 1760A-B are generated based on security identifier sets 1720A-N. In practice, such representations can be separately built for different permission types as well.

In the example, the differing security identifiers 1721A-N, 1722A-N will result in different permitted segments 1765A-N in the permitted ranges 1760A-N in the entitlement space.

Such representations 1760A-N can be pre-computed (e.g., and cached) for anticipated entitlement requests as described herein.

Example 31

Exemplary Checking of Pre-built Ranges in Entitlement Space

Figure 18:
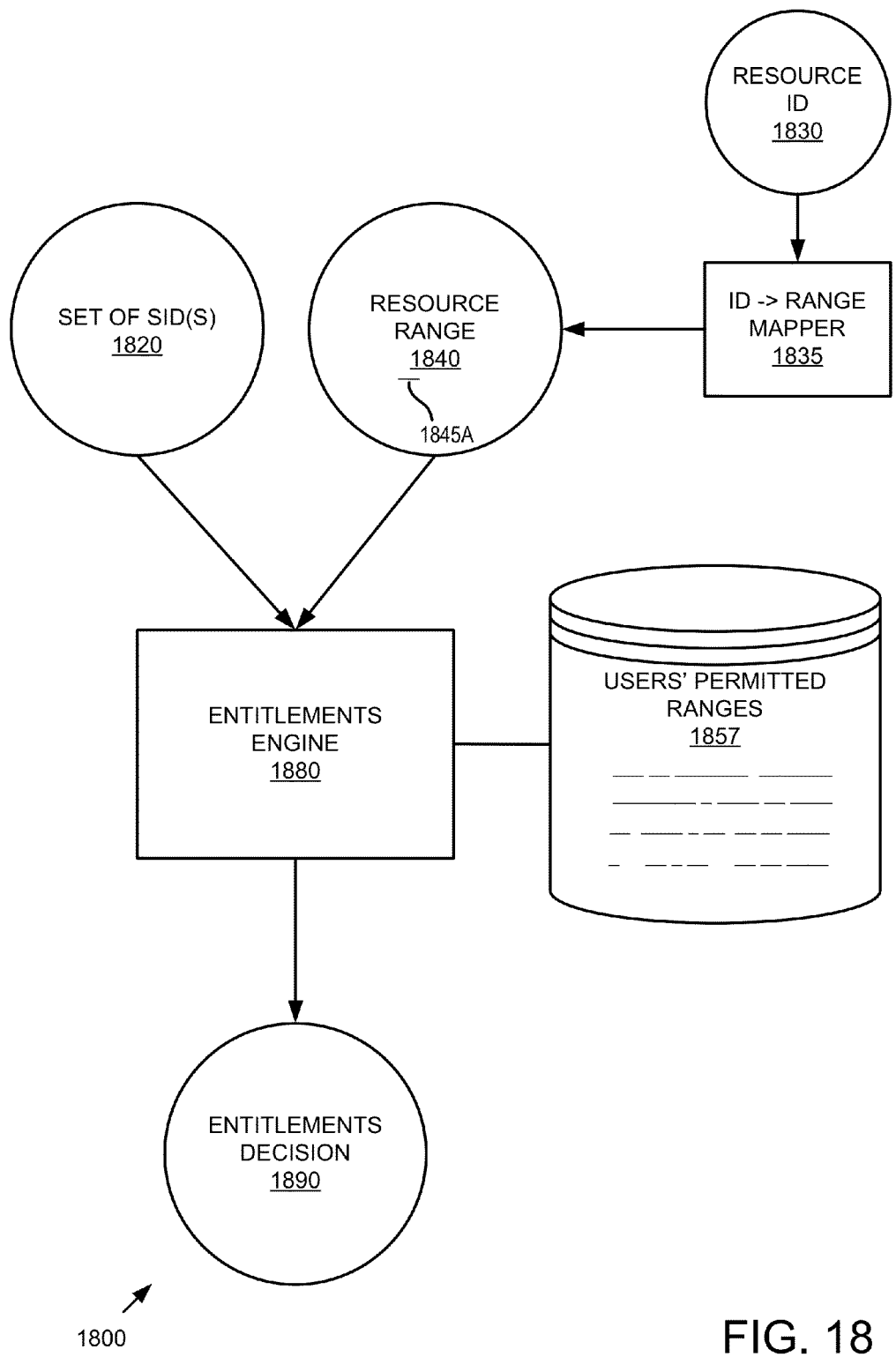
FIG. 18 is a block diagram of an exemplary system checking pre-building ranges in an entitlement space.

FIG. 18 is a block diagram of an exemplary system 1800 checking pre-building ranges in an entitlement space. In the example, the entitlements engine 1880 can accept a set of security identifiers 1820 and a resource range 1840 (e.g., visual shown by 1845A) and check it against the users' permitted ranges 1857. In practice, one or more permission types can also be supported.

A resource identifier 1830 can be mapped to the resource range 1840 via an identifier to range mapper 1835.

The entitlements engine 1880 can then output an entitlements decision 1890. In practice, a batch of resource identifiers can be processed for a set of security identifiers efficiently.

Example 32

Exemplary Adding Access Rule to Tree Representation

Figure 19:
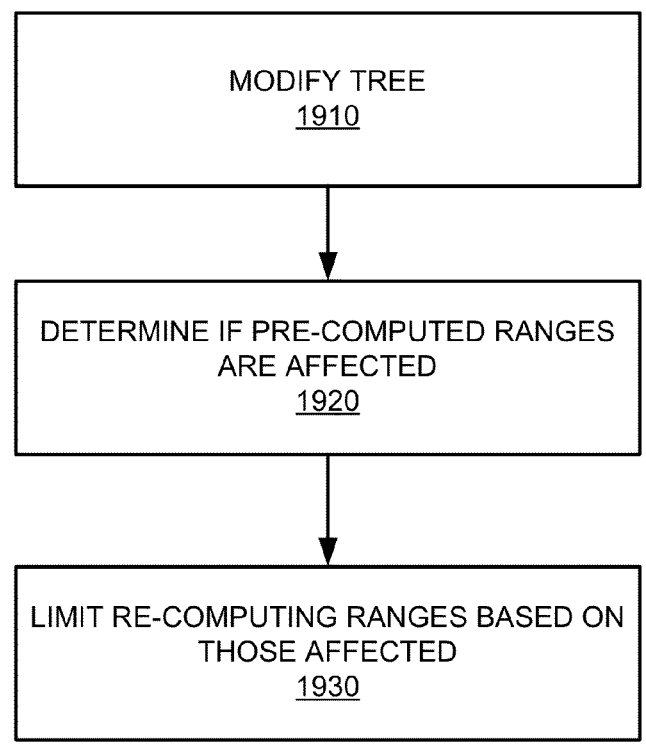
FIG. 19 is a flowchart of an exemplary method of adding an access rule to a tree representation.

FIG. 19 is a flowchart of an exemplary method 1900 of adding an access rule to a tree representation and can be used in any of the examples herein to modify the underlying tree representation of access rules.

At 1910, the tree is modified (e.g., a new rule is added). For example, a new node in the tree can be added as a child to an existing node. The new node can have an associated access rule.

At 1920, it can be determined whether the addition of the access rule modifies pre-computed permitted ranges. For example, if a rule does not pertain to a user or permission type, the pre-computed permitted ranges in the entitlements space are not affected.

At 1930, re-computation of the permitted ranges can be limited to those that are affected. For example, it is not necessary to re-compute permitted ranges if they are not affected by the new node.

In practice, many changes to the access rules can be incorporated without having to re-compute the permitted ranges. Therefore, the tree representation is resilient in the face of changes to entitlements.

Example 33

Exemplary Implied Permissions

In any of the examples herein, implied permissions can be supported by the entitlements engine. For example, if two permission types are used as input, the most permissive result (e.g., a logical OR of resulting entitlement decisions) can be used as the ultimate entitlement decision for the implied permissions.

The application submitting the entitlement request can decide whether to support such implied permissions. An example would be an application that grants an edit permission that implies a read permission. An explicit read permission need not be specified in the access rules if an edit permission (e.g., for a particular security identifier) is already present.

Example 34

Exemplary List of Permitted Ranges Building

The following can be used to build a list of ranges for a user/permission pair:
1. Start with an empty list of ranges.
2. Load the rules for the user and the groups the user is a member of. This has a complexity of O(n), where n is how many groups the users is a member of.
3. Sort the loaded rules. The loads from 1, above, are already sorted, so this is just a merge of sorted sets. This has complexity O(n), where n is the number of loaded rules.
4. Combine the ranges represented by the tree (node) ids. Grants are union, revokes are complements. These are applied in order so the subtraction (e.g., revokes) can remove whatever it applies to. This has complexity O(n), where n is the number of loaded rules.

Example 35

Exemplary Resolution of Entitlement Check

Given a sequence of intervals, it can be checked whether a user is permitted by testing to see if any of the intervals contain the resource. For example, given the following:
built intervals: [A . . . B) union [D . . . F) union [I . . . Z]
An input set of {c,D,E}
{D,E} are permitted
Possible techniques for testing include Linear, Binary search and Merge-Join.

In a Linear approach, for each member of the input set, walk the list testing membership in the interval.

For a binary search (e.g., because the built intervals are sorted), Arrays.binarySearch([A,D,I], C) is −2. (−(−2)−1) is 1 ("insertion point"), so the most applicable range is [A,B). Fails. Arrays.Arrays.binarySearch([A,D,I],E) is −3, so test [D . . . F]. Success.

For merge join, if input is sorted, one can walk it in lockstep with the intervals. Only one loop need be used.

Example 36

Memory and Caching Considerations

Given the constraints placed on the ranges, {[A . . . B) union [D . . . F) union [I . . . Z]} can be equivalently represented as the character string "ABDFIZ." This is also a unique, unambiguous form that represents a set of entitlement rules. It's also very compact and easy to serialize.

A tree node identifier can take different forms. One is the continued fraction (2.2.1), which is used for sorting the rules. A second form is a rational number A/B, where A>B>=1. If the rational form of the tree node identifier is taken, the set of unions can be represented as an integer array. The intervals {[2/1 . . . 8/3) union [14/5 . . . 48/17], [17/6 . . . 3/1)} can be stored as int [2, 1, 8, 3, 14, 5, 48, 17, 17, 6, 3, 1]. There are four terms in the int array for each input interval. This is an extremely compact form in-memory and in cache and very simple to serialize.

When doing per-user entitlement checks in memory, an object expires when 1) there are new ACL rules for a user, 2) there are new rules for a group of which the user is a member, or 3) there is a change to the user's group membership.

If using 4 integers per rule, 1000 rules is about 16 kilobytes.

Example 37

Exemplary Early Binding Implementation

An early binding of the technologies as described in FIGS. 7 and 8 can be implemented by maintaining a representation of lineage for resources (e.g., nodes) in the hierarchical tree as described. A table-based implementation can be used.

A table of resources "Resource" can be stored as follows with reference to FIG. 9:

| Node Id | Location (e.g. Tree node identifier) |
| --- | --- |
| C | 5/3 |

In the example, a table "Resource_Auth" stores the lineage for rules (e.g., the location (tree node identifier) of the node and any parents) as follows:

| Node Id | Location (e.g., Tree node identifier) | Lineage |
| --- | --- | --- |
| C | 5/3 | 5/3 |
| C | 5/3 | 1 |

Grants to the user are included in the query entitlement terms. If there is only one grant at node A 921, the terms can be "1" and the query is "Select * from Resource JOIN Resource_Auth WHERE Resource_Auth.Lineage="1"" which will return "C" as the resource.

If grants were to B 931 and G 944, the terms can be '3/2' and '19/11' (e.g., WHERE (Resource_Auth.Lineage='1' OR Resource_Auth.Lineage='19/11').

The query returns the resources for which the user has permission.

Example 38

Exemplary Interpretation of Tree Representation

In any of the examples herein, entitlements can be hierarchical. The governing entitlement rule can be the one closest to the content (e.g., furthest down the tree). An entitlement granted to a user or group can have the same force. The ranking used can be the location in the hierarchy.

A permission may imply other permissions (e.g., edit implies view). Direct and implied permissions can be considered identically. The ranking used can be the location in the hierarchy.

A tree node identifier can be assigned to resources. The identifiers allow sorting a set of access control entries (e.g., a basic tuple of user, permission type, and resource) by their position in the tree.

Example 39

Exemplary Stack-based Implementation

A stack approach can be used to build an entitlements search string. When forming a query to the index service, the string can be passed along in the query so that the search service can filter the results to what the individual user can see. The rules can be set up in pre-order (e.g., depth first).

Figure 20:
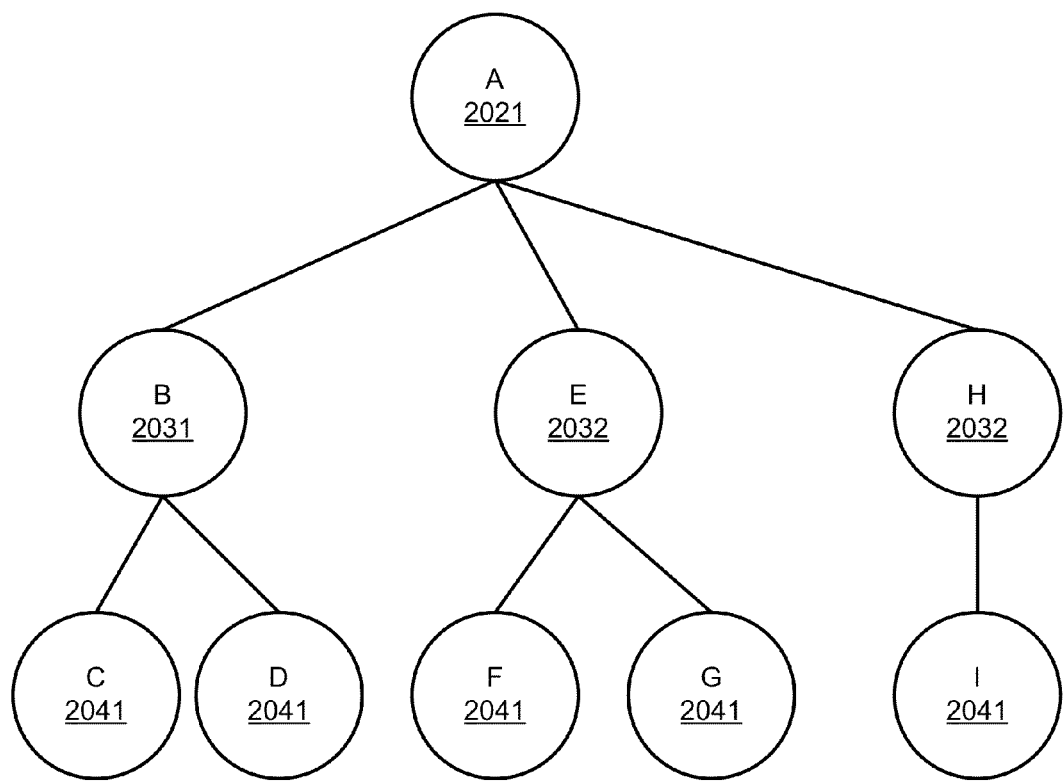
FIG. 20 is a diagram of an exemplary tree.

A grant is an OR with other grants if there are no revokes. So, one can OR a grant (with other grants) minus its revokes.
grant B, grant E=>(B OR E)
grant B, revoke D, grant E=>(B NOT D)OR E
The process can be done as follows:
1. Create a stack
2. Walk the rules in pre-order (e.g., in FIG. 20, pre order is A, B, C, D, E, F, G, H, I)
3. If the rule is a grant, push it on to the stack
4. If the rule is a revoke, walk the stack and attach it to the first ancestor GRANT found
5. If the revoke does not have an ancestor, discard it
6. Form elements in the stack into a family (foo AND NOT bar AND NOT baz)
7. Join the families with OR With reference to FIG. 20, given a rule set (+A−E+F):
1. Start with empty stack [ ]
2. A is a grant, push it onto the stack [(+A)]
3. E is revoke, and under A, attach it to A [(+A−E)]
4. F is a grant, push [(+A−E), (+F)]
5. form (A AND NOT E)
6. form (F)
7. combine to form (A AND NOT E) OR (F)

With reference to FIG. 20, given a rule set (+B−E+F)
1. B is a grant, push it onto the stack [(+B)]
2. E is a revoke, walk the stack, find no ancestor, discard
3. F is a grant, push it onto the stack [(+B), (+F)]
4. combine to form (B) OR (F)

With reference to FIG. 20, given a rule set (+A, −B, −H)
1. A is a grant [(+A)]
2. B is a revoke, under A [(+A, −B)]
3. H is a revoke, under A [(+A, −B, −H)]
4. form (A AND NOT B AND NOT H)

With reference to FIG. 20, given a rule set (+A, −B, +D, −H)
1. A is a grant [(+A)]
2. B is a revoke, under A [(+A, −B)]
3. D is a grant, push [(+A, −B), (+D)]
4. H is a revoke. It's not under D, so walk down. It is under A, so attach [(+A, −B, −H), (+D)]
5. form (A AND NOT B AND NOT H) OR (D)

Example 40

Exemplary Further Implementations

An entitlement system can answer the question, "Can this person access this resource?" Internal representations can include the following:

SID [security identifier] ("who"): The person granted or requesting permission. It can be both users and groups, and can nest (e.g., sids can be parents of other sids).

Permission type ("what"): The action being requested. Having one permission type can imply another permission type.

Resource ("where"): The resource being operated upon. It can be a space or group, or an individual piece of content. Resources can nest. It can be identified by an identifier.

The following questions can be asked:
1. Is this {side, permission, resource} tuple permitted? This is the primitive query. It can be used for correctness checks and the admin. This is sometimes called "late binding."
2. What object can a user see? This can be used to restrict the view model as part of late binding. Can be exported to search for use in early binding.
3. What users can see this object? This can be a front-end feature for object/place owners to view who has access to them.

Example 41

Exemplary Core Tables

The following tables can be used:
TABLE resource
key: resource-id
columns:
1. "parent" resource-id (referencing this table)
2. "ACE[access control entry]:order" One column per entry in the ACL [access control list].
3. "tree_id" The location of the resource in the tree of resources [tree node identifier]
TREE sid
key: sid-id
columns:
1. "parent:parent-sid" Users can be in multiple groups; one column for each group. No value is needed.
Other tables can be derived
TABLE resource_tree (An index from tree-id to resource_id)
key: tree_id
columns:
1. "resource_id" resource_id from the source resource
TABLE sid_acl (The ACEs by grantee and permission)
key: sid:permission:tree_id:order (order is the ACEs position in the resource's ACL)
columns:
1. "access" allow or deny
A GET can be a single-row query with a known key.
An MGET can be a batch of gets with a set of known keys.
A SCAN can be a prefix scan on a partial key

Example 42

Exemplary Query

For "Is this {sid, permission, resource} tuple permitted?" the following can be done:
Scan ACEs matching a user, ordered up the tree from the resource
The closest rule to the resource wins (grant allows, revoke denies)
The query can be done on the core tables without the derived ones.
The user can be expanded into the groups of which the user is a member. A recursive query starting with GET Aid/{id} can be used. It recurses upwards. There can be N calls, where N is the depth of the tree. Typically, the user-group tree is very flat.

MGET/sid/{parent-id}

Now the list of sids is obtained.

Turning to the resources,

GET/resource/{id} can be performed, and then crawl up to ancestor resources. This can be a serial walk. There can be N calls, where N is the depth of the tree.

GET/resource/{tree-id}

Now that the ACL data is obtained, it can be analyzed n tree order, the furthest ACL down the tree which has a rule matching any of the sids wins (grant allows, revoke denies).

The sids can be pushed down as a filter.

Example 43

Exemplary Query

For "What objects can a user see?" the following can be done:

It can be used to restrict the view model as part of late binding. It can be exported to search for use for early binding. It can be exported to search for use in a RangeFilter for early binding.

It can proceed as follows:

Collect the rules that apply to the user.

Process them from top down, relative to the resource tree

Build a set of resources the user can view—expressed as tree_ids

The queries can be as follows:

Expand the sids to the groups of which the user is a member

GET/sid/{id}

MGET/sid/{parent-id}(x depth of tree)

Collect the rules that apply to the user. This can be done with one scan per group the user is in, or multi scan can be used.

SCN/sid_acl/{sid}:{perm}:

"sid:perm:" can be picked off and then the results can be merge-sorted so they are in proper tree order, resulting in a list of {tree,access} tuples. The ACE order can be respected.

The tree-Id uniquely defines both the resource and the set of descendants of the resource. By the id, one can know the depth of the tree.

The tuples can be turned into a Boolean expression. The first tuple can be a grant.

Figure 21:
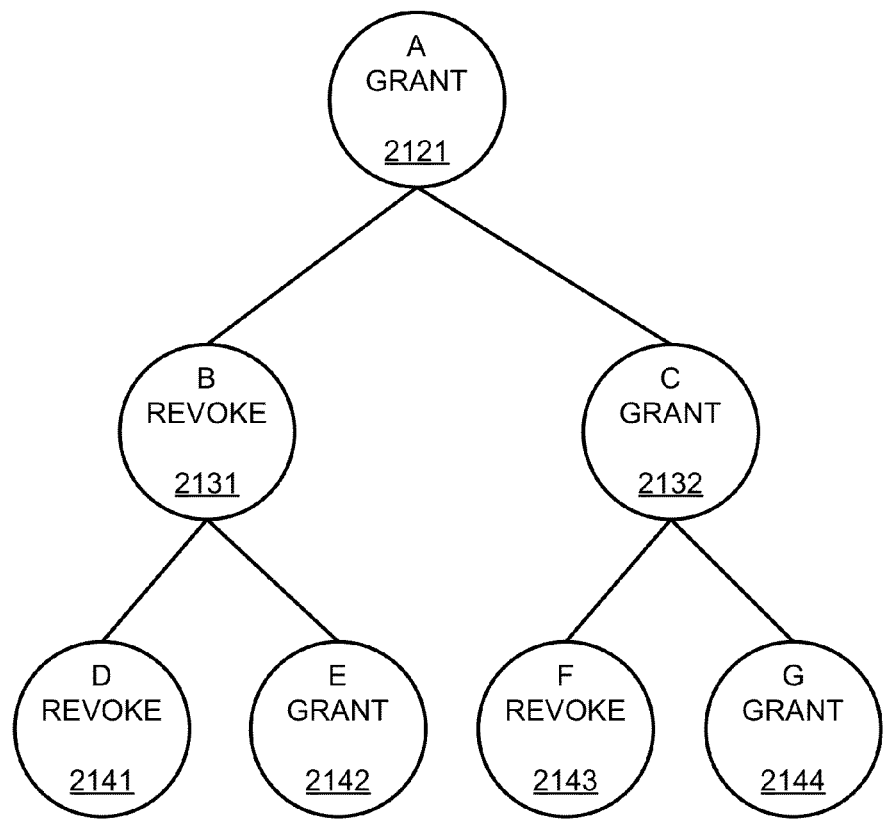
FIG. 21 is a diagram of an exemplary tree.

FIG. 21 is a diagram of an exemplary tree. With the tree, someone (e.g., user or security identifier) is granted A, revoked B, granted E, revoked F. The processing of building the last line can start with the following:

tuples: {a, allow}, {B, deny}, {E, allow}, {F, deny}

The process can start with A, which represents the range [0,1). Next is {B,deny}, which represents [0,1/2), so one can subtract that from A and end up with [1/2,1). {E,allow} is the range [1/4, 1/2), one can add that and get [1/4,1), and then {F,deny} is [1/2,3/4), so the end result is {[1/4,1/2),[3/2,1)}.

The number of ranges can be bound by the number of rules for the user. If the number of rules becomes overwhelming, the range intersection could be bit sets.

One implementation can choose to index the tree_id (which is a rational number) with the document, and then implement the range predicates using a FieldCacheRangeFilter. (tree_id[0.25,0.5] OR tree_id:[0.75,1])

Alternatively, the predicate can be materialized into another table and a request can be bound to it. The tree_ids can be turned back into resource ids.

If there is a permission that implies another, one can just do the whole exercise again and merge the final results.

Example 44

Exemplary Query

For "What users can see this object?" the following can be done:

This can be used for visual inspection of a resource. A User interface control may need to display a set of data.

Processing can proceed as follows:

Get the rules for the item and ancestors.

Resolve duplicates. If there is a "grant view to registered users" higher up and a "revoke view to registered users" lower down, they just go away.

If there is a "grant view to employees" higher than "grant view to Pete," the grant to Pete can be hidden.

The rules can be turned into a sentence: "All employees except Bob."

Example 45

Exemplary Alternatives

A complete access control list (e.g., ordered list of access control entries assigned to a resource) can be stored with the resource.

A per-user entitlement table can store a de-normalization of access control list data (e.g., just the direct grants to the user).

Example 46

Exemplary Advantages

The rules for resolving an entitlement request can be completely defined by the access control entries assigned to the user and the access control entries assigned to groups the user is in. The decision can be made independently of other access control entries.

Complexity can follow the number of assigned rules, not the scale of the content.

Since entitlements can be defined completely by the access control entries, the check need not be aware of the content hierarchy (e.g., the size of the content hierarchy).

A tree node identifier represents a way to identify both a single item and a range of items due to the way it is calculated.

It is possible to determine if a resource's tree node identifier is governed by a rule by comparing the tree node identifier's value, without directly referencing the hierarchy itself.

The tree node identifier can be a range, and ranges can support union and intersection. The rules can be flattened into a single set of non-overlapping ranges in an entitlement space that represent what a user can do.

Resolving entitlement from a simple set of interface can be fast and with little resources. Building the set can have low complexity. Storing the set can take little space, and it expires only upon a set of medium frequency events. In addition, one can resolve large entitlement checks using a parallel processing technique.

Example 47

Exemplary Computing Systems

Figure 22:
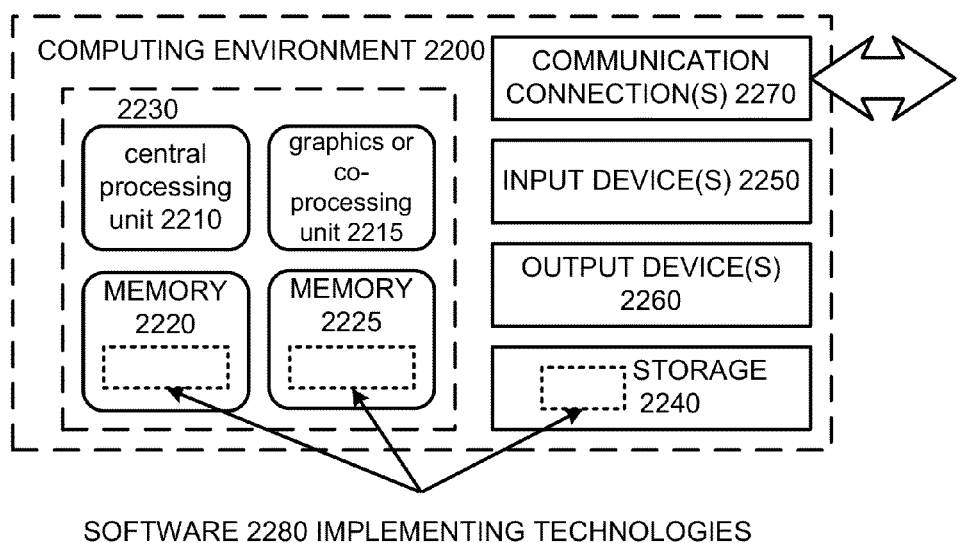
FIG. 22 is a diagram of an exemplary computing system in which described embodiments can be implemented.
Figure 23:
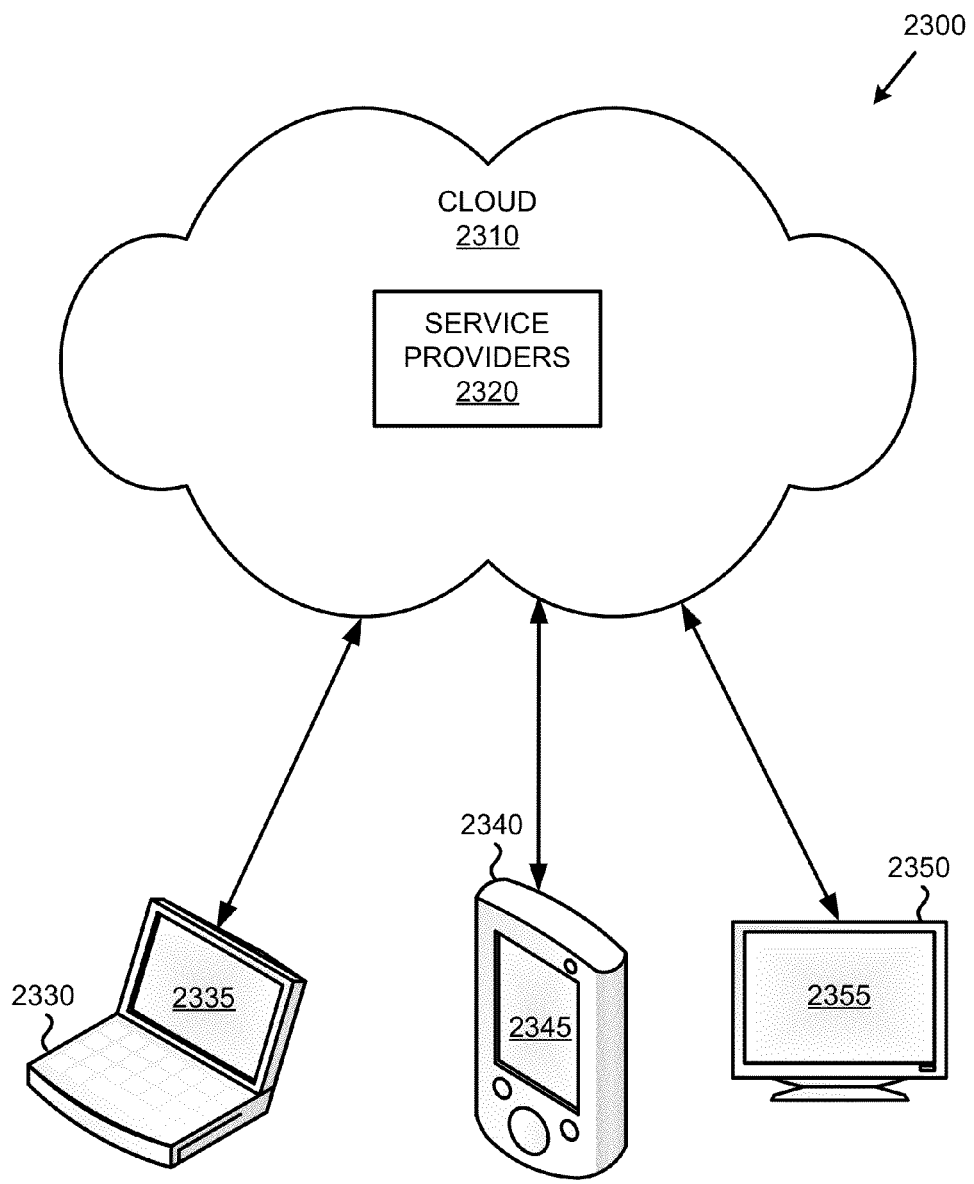
FIG. 23 is an exemplary cloud-support environment that can be used in conjunction with the technologies described herein.

FIG. 22 illustrates a generalized example of a suitable computing system 2200 in which several of the described innovations may be implemented. The computing system 2200 is not intended to suggest any limitation as to scope of use or functionality, as the innovations may be implemented in diverse general-purpose or special-purpose computing systems.

With reference to FIG. 22, the computing system 2200 includes one or more processing units 2210, 2215 and memory 2220, 2225. In FIG. 22, this basic configuration 2230 is included within a dashed line. The processing units 2210, 2215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 22 shows a central processing unit 2210 as well as a graphics processing unit or co-processing unit 2215. The tangible memory 2220, 2225 may be volatile memory (e.g., registers, cache, RAM), nonvolatile memory (e.g., ROM, EEPROM, flash memory, etc.), or some combination of the two, accessible by the processing unit(s). The memory 2220, 2225 stores software 2280 implementing one or more innovations described herein, in the form of computer-executable instructions suitable for execution by the processing unit(s).

A computing system may have additional features. For example, the computing system 2200 includes storage 2240, one or more input devices 2250, one or more output devices 2260, and one or more communication connections 2270. An interconnection mechanism (not shown) such as a bus, controller, or network interconnects the components of the computing system 2200. Typically, operating system software (not shown) provides an operating environment for other software executing in the computing system 2200, and coordinates activities of the components of the computing system 2200.

The tangible storage 2240 may be removable or non-removable, and includes magnetic disks, magnetic tapes or cassettes, CD-ROMs, DVDs, or any other medium which can be used to store information in a non-transitory way and which can be accessed within the computing system 2200. The storage 2240 stores instructions for the software 2280 implementing one or more innovations described herein.

The input device(s) 2250 may be a touch input device such as a keyboard, mouse, pen, or trackball, a voice input device, a scanning device, or another device that provides input to the computing system 2200. For video encoding, the input device(s) 2250 may be a camera, video card, TV tuner card, or similar device that accepts video input in analog or digital form, or a CD-ROM or CD-RW that reads video samples into the computing system 2200. The output device(s) 2260 may be a display, printer, speaker, CD-writer, or another device that provides output from the computing system 2200.

The communication connection(s) 2270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 48

Exemplary Cloud-Supported Environment

In example environment 2300, the cloud 2310 provides services for connected devices 2330, 2340, 2350 with a variety of screen capabilities. Connected device 2330 represents a device with a computer screen 2335 (e.g., a mid-size screen). For example, connected device 2330 could be a personal computer such as desktop computer, laptop, notebook, netbook, or the like. Connected device 2340 represents a device with a mobile device screen 2345 (e.g., a small size screen). For example, connected device 2340 could be a mobile phone, smart phone, personal digital assistant, tablet computer, and the like. Connected device 2350 represents a device with a large screen 2355. For example, connected device 2350 could be a television screen (e.g., a smart television) or another device connected to a television (e.g., a set-top box or gaming console) or the like. One or more of the connected devices 2330, 2340, 2350 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 2300. For example, the cloud 2310 can provide services for one or more computers (e.g., server computers) without displays.

Services can be provided by the cloud 2310 through service providers 2320, or through other providers of online services (not depicted). For example, cloud services can be customized to the screen size, display capability, and/or touch screen capability of a particular connected device (e.g., connected devices 2330, 2340, 2350).

In example environment 2300, the cloud 2310 provides the technologies and solutions described herein to the various connected devices 2330, 2340, 2350 using, at least in part, the service providers 2320. For example, the service providers 2320 can provide a centralized solution for various cloud-based services. The service providers 2320 can manage service subscriptions for users and/or devices (e.g., for the connected devices 2330, 2340, 2350 and/or their respective users).

Example 49

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 50

Further Embodiments

The following can be implemented:

A1. A method implemented at least in part by a computer, the method comprising:
receiving one or more security identifiers identifying a user identifier;
generating one or more query terms according to a plurality of access rules for resources, wherein the access rules are organized as respective rule ranges in an entitlement space according to an underlying hierarchical representation; and
with the one or more query terms, performing a query on a representation of a lineage of the resources, wherein the query determines which resources to which the user identifier has access.

A2. The method of claim A1 wherein:
the query terms comprise access grants as specified in the access rules.

A3. The method of claim A3 wherein:
the representation of the lineage of the resources specifies parents for a given resource in the underlying hierarchical representation of the resources.

A4. A system comprising:
a plurality of access rules stored in one or more computer-readable devices;
a resource lineage representation storing one or more parents for a given resource;
a query generator configured to generate a query including access grants to a specified user identifier as query terms;
an entitlements engine configured to run the query against the resource lineage representation, wherein results of the query indicate to which resources the user identifier has access.

A5. The system of A4 wherein:
the results of the query comprise resource identifiers.

A6. A method implemented at least in part by a computer, the method comprising:
organizing access control rules and resource identifiers via an underlying hierarchical tree structure in an entitlement space;
receiving an entitlement request; and
processing the entitlement request according to the hierarchical tree structure.

A7. The method of claim A6 wherein:
the entitlement request comprises a request for resources accessible by a given user identifier.

A8. The method of claim A6 wherein:
the entitlement request comprises a request of whether a given resource is accessible by a user identifier.

A9. The method of claim A6 wherein:
the entitlement request comprises a request of which user identifiers have access to a given resource.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method implemented at least in part by a computer, the method comprising:
receiving, in the computer, one or more respective resource identifiers identifying one or more respective resources;
generating, in the computer, one or more entitlement decisions for respective of the resource identifiers according to a plurality of access rules for the resources, wherein the access rules are organized as respective rule ranges in an entitlement space, and wherein a rule range for an access rule is represented by one or more unique rational numbers; and
storing, in the computer, for a set of given security identifiers, the entitlement space as a union of a plurality of permitted ranges from the one or more unique rational numbers representing respective rule ranges, wherein the plurality of permitted ranges comprises access rules filtered based on the given security identifiers, the union of the plurality of permitted ranges represents a subset of the access rules, the subset of the access rules has fewer than all of the access rules, and at least two of the plurality of permitted ranges are not adjacent to each other.

2. The method of claim 1 further comprising:
representing the access rules as respective rule ranges between two rational numbers in the entitlement space.

3. The method of claim 1) wherein the method further comprises:
mapping a resource identifier to a resource range in the entitlement space; and
comparing the resource range to the union of the plurality of permitted ranges in the entitlement space.

4. The method of claim 1 wherein:
the rule ranges represent respective locations of the access rules in a hierarchical arrangement.

5. The method of claim 4 wherein:
in the hierarchical arrangement, the rule ranges of rules in a same level of the hierarchical arrangement are non-overlapping in the entitlement space.

6. The method of claim 4 wherein:
in the hierarchical arrangement, the rule range of a child rule is fully overlapped by that of a parent rule of the child rule in the entitlement space, and the child rule overlaps no other rules at a level in the hierarchical arrangement of the parent rule.

7. The method of claim 4 wherein:
the rule range of a child rule in the entitlement space is computed according to a technique that supports endlessly adding additional sibling rules for the child rule and endlessly adding grandchild rules.

8. The method of claim 1 wherein:
the rule ranges are represented by respective rational numbers; and
a given rule range is uniquely identified by a single rational number.

9. The method of claim 1 wherein:
the rule ranges are represented by respective rational numbers; and
a given range is uniquely identified by continued-fraction form.

10. The method of claim 1 wherein:
the rule ranges unambiguously represent a location of a rule in a hierarchical arrangement.

11. The method of claim 1) further comprising:
receiving the one or more given security identifiers;
wherein the generating generates entitlement decisions based on whether the access rules permit access by any of the one or more given security identifiers.

12. The method of claim 11 wherein:
the one or more given security identifiers identify a user.

13. The method of claim 11, wherein the stored entitlement space comprises pre-computed permitted ranges determined by the one or more security identifiers.

14. The method of claim 1 further comprising:
receiving one or more permission types;
wherein the generating generates entitlement decisions based on whether the access rules permit access according to the permission types.

15. The method of claim 14 wherein:
the permission types support implied permissions.

16. A system comprising:
a plurality of access rules stored in one or more computer-readable devices;
an entitlements engine configured to receive one or more resource identifiers, one or more permission types, and one or more security identifiers and further configured to generate one or more entitlement decisions based on the access rules;
wherein the access rules are organized according to an underlying hierarchical tree defining an entitlement space, and the resource identifiers are associated with respective nodes in the underlying hierarchical tree that correspond to ranges in the entitlement space, and wherein the access rules in the underlying hierarchical tree are associated with respective single rational numbers that uniquely position the access rules in the underlying hierarchical tree; and
wherein the entitlements engine is further configured to store pre-computed permitted ranges of access rules as a set of unions of the pre-computed permitted ranges, the pre-computed permitted ranges for a particular union out of the set of unions comprise access rules filtered based on the one or more security identifiers, the pre-computed permitted ranges of the particular union represent a subset of the access rules, the subset of the access rules has fewer than all of the access rules, and at least two of the pre-computed permitted ranges are not adjacent to each other.

17. The system of claim 16 wherein:
the underlying hierarchical tree defines permitted ranges in the entitlement space for a given set of permission types and a given set of security identifiers.

18. The system of claim 16 wherein:
the access rules are ordered by depth in the hierarchical tree.

19. One or more non-transitory computer-readable devices comprising computer-executable instructions causing a computing system to perform a method comprising:
receiving a plurality of resource identifiers;
receiving a plurality of permission types;
receiving a plurality of security identifiers;
storing a set of access rules organized in a hierarchical arrangement according to depth in the hierarchical arrangement, wherein each access rule within the set is identified by a unique pair of rational numbers;
based on the access rules, permission types, and security identifiers, constructing a plurality of representations of permitted ranges in an entitlement space, wherein each permitted range comprises segments bounded by unique rational numbers, and wherein each representation is based on a respective set of permission types and security identifiers;
storing the permitted ranges as unions of the segments, wherein at least one union out of the unions of the segments is formatted as an integer array of quotients and denominators of the unique rational numbers;
mapping the resource identifiers to respective resource ranges in the entitlement space;
for the resource ranges, checking if the resource range overlaps with a stored permitted range in the entitlement space; and
outputting entitlement decisions for respective of the resource identifiers according to the checking.

20. One or more non-transitory computer-readable devices comprising computer-executable instructions causing a computing system to perform:
receiving, in the computer, one or more respective resource identifiers identifying one or more respective resources;
generating, in the computer, one or more entitlement decisions for respective of the resource identifiers according to a plurality of access rules for the resources, wherein the access rules are organized as respective rule ranges in an entitlement space, and wherein a rule range for an access rule is represented by one or more unique rational numbers; and
storing, in the computer, for a set of given security identifiers, the entitlement space as a union of a plurality of permitted ranges from the one or more unique rational numbers representing respective rule ranges, wherein the plurality of permitted ranges comprises access rules filtered based on the given security identifiers, the union of the plurality of permitted ranges represents a subset of the access rules, the subset of the access rules has fewer than all of the access rules, and at least two of the plurality of permitted ranges are not adjacent to each other.

* * * * *

UNITED STATES PATENT AND TRADEMARK OFFICE
CERTIFICATE OF CORRECTION

PATENT NO. : 9,111,104 B2
APPLICATION NO. : 13/853940
DATED : August 18, 2015
INVENTOR(S) : Gilroy et al.

Page 1 of 1

It is certified that error appears in the above-identified patent and that said Letters Patent is hereby corrected as shown below:

In the Claims:

Column 26, line 51 (Claim 3), "claim 1) wherein" should read --claim 1 wherein--
Column 27, line 21 (Claim 11), "claim 1) further" should read --claim 1 further--

Signed and Sealed this
Second Day of August, 2016

Michelle K. Lee
*Director of the United States Patent and Trademark Office*